United States Patent
Islam et al.

(10) Patent No.: US 11,445,429 B2
(45) Date of Patent: Sep. 13, 2022

(54) RESOURCE UTILIZATION BASED EVENT TRIGGERING IN WIRELESS COMMUNICATIONS

(71) Applicant: QUALCOMM Incorporated, San Diego, CA (US)

(72) Inventors: Muhammad Nazmul Islam, Littleton, MA (US); Piyush Gupta, Bridgewater, NJ (US); Luca Blessent, Whitehouse Station, NJ (US); Tao Luo, San Diego, CA (US); Karl Georg Hampel, Hoboken, NJ (US); Navid Abedini, Somerset, NJ (US); Jianghong Luo, Skillman, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 92 days.

(21) Appl. No.: 16/676,847

(22) Filed: Nov. 7, 2019

(65) Prior Publication Data
US 2020/0154336 A1    May 14, 2020

Related U.S. Application Data

(60) Provisional application No. 62/760,000, filed on Nov. 12, 2018.

(51) Int. Cl.
*H04B 7/026* (2017.01)
*H04B 7/155* (2006.01)
(Continued)

(52) U.S. Cl.
CPC ............ *H04W 40/22* (2013.01); *H04B 7/026* (2013.01); *H04B 7/15542* (2013.01);
(Continued)

(58) Field of Classification Search
CPC .......... H04B 7/02–026; H04B 7/14–17; H04B 17/0082–409; H04L 45/02–748;
(Continued)

(56) References Cited

U.S. PATENT DOCUMENTS

| 2021/0045037 A1* | 2/2021 | Wei ........................ H04W 40/22 |
| 2021/0219368 A1* | 7/2021 | Fujishiro ........... H04W 36/0055 |
| 2021/0258244 A1* | 8/2021 | Xu .......................... H04L 45/28 |

OTHER PUBLICATIONS

International Search Report and Written Opinion—PCT/US2019/060418—ISA/EPO—dated Jun. 29, 2020 (190281WO).
(Continued)

*Primary Examiner* — Timothy J Weidner
(74) *Attorney, Agent, or Firm* — Danai Nelisile Mhembere; Holland & Hart LLP

(57) ABSTRACT

Methods, systems, and devices for wireless communications are described that support resource utilization based event triggering. A wireless node in a wireless communications system may establish a connection with a core network via a path that includes one or more relay nodes. The wireless node may determine that a network load associated with one or more paths between the wireless node and the core network has changed, or that a difference between two or more network loads of different paths has changed. Based on such a determination, the wireless node may transmit a report to the network. In some cases, the network may receive the report from the wireless node, and may initiate a path change based on the report.

21 Claims, 22 Drawing Sheets

(51) Int. Cl.
| | |
|---|---|
| H04B 17/318 | (2015.01) |
| H04B 17/336 | (2015.01) |
| H04B 17/373 | (2015.01) |
| H04B 17/40 | (2015.01) |
| H04W 24/02 | (2009.01) |
| H04W 24/06 | (2009.01) |
| H04W 24/08 | (2009.01) |
| H04W 24/10 | (2009.01) |
| H04W 28/02 | (2009.01) |
| H04W 28/08 | (2009.01) |
| H04W 36/00 | (2009.01) |
| H04W 40/04 | (2009.01) |
| H04W 40/12 | (2009.01) |
| H04W 40/22 | (2009.01) |
| H04W 40/24 | (2009.01) |
| H04W 80/02 | (2009.01) |
| H04W 84/04 | (2009.01) |
| H04W 84/22 | (2009.01) |
| H04W 88/04 | (2009.01) |
| H04W 88/08 | (2009.01) |
| H04W 88/14 | (2009.01) |
| H04W 92/02 | (2009.01) |
| H04W 92/10 | (2009.01) |
| H04W 92/20 | (2009.01) |

(52) U.S. Cl.
CPC ......... *H04B 17/318* (2015.01); *H04B 17/336* (2015.01); *H04B 17/373* (2015.01); *H04B 17/40* (2015.01); *H04W 24/02* (2013.01); *H04W 24/06* (2013.01); *H04W 24/08* (2013.01); *H04W 24/10* (2013.01); *H04W 28/021* (2013.01); *H04W 28/0247* (2013.01); *H04W 28/0289* (2013.01); *H04W 28/08* (2013.01); *H04W 28/0942* (2020.05); *H04W 28/0983* (2020.05); *H04W 36/0058* (2018.08); *H04W 36/0085* (2018.08); *H04W 36/0094* (2013.01); *H04W 36/00837* (2018.08); *H04W 40/04* (2013.01); *H04W 40/12* (2013.01); *H04W 40/246* (2013.01); *H04W 40/248* (2013.01); *H04W 80/02* (2013.01); *H04W 84/047* (2013.01); *H04W 84/22* (2013.01); *H04W 88/04* (2013.01); *H04W 88/08* (2013.01); *H04W 88/14* (2013.01); *H04W 92/02* (2013.01); *H04W 92/10* (2013.01); *H04W 92/20* (2013.01); *Y02D 30/70* (2020.08)

(58) Field of Classification Search
CPC ..... H04W 8/22–245; H04W 24/02–10; H04W 28/02–26; H04W 36/0005–385; H04W 40/005–38; H04W 76/10–50; H04W 80/02–12; H04W 84/005–22; H04W 88/005–188; H04W 92/02–24; Y02D 30/70

See application file for complete search history.

(56) References Cited

OTHER PUBLICATIONS

Kyocera Corp: "Re 1-10 Enhancements for Cell Load Reporting", 3GPP Draft, 3GPP TSG RAN WG3 Meeting #70, R3-103434, 3rd Generation Partnership Project (3GPP), Mobile Competence Centre, 650, Route Des Lucioles, F-06921 Sophia-Antipolis Cedex, France, vol. RAN WG3, No. Jacksonville, USA, Nov. 15, 2010, Nov. 9, 2010 (Nov. 9, 2010), XP050467361, 6 pages, paragraph [02.2].

Lenovo, et al., "Parent Node Selection for IAB Access", 3GPP Draft, 3GPP TSG-RAN WG2 Meeting #104, R2-1817169, Parent Node Selection for IAB Access VI, 3rd Generation Partnership Project (3GPP), Mobile Competence Centre, 650, Route Des Lucioles, F-06921 Sophia-Antipolis Cedex, France, vol. RAN WG2, No. Spokane, USA, Nov. 12, 2018-Nov. 16, 2018, Nov. 2, 2018 (Nov. 2, 2018), XP051481087, 3 pages, Retrieved from the Internet: URL: http://www.3gpp.org/ftp/tsg%5Fran/WG2%5FRL2/TSGR2%5F104/Docs/R2%2D1817169%2Ezip. [retrieved on Nov. 2, 2018] p. 2; figures 2,3.

Samsung, et al., "F1AP Function Definition and Categorization", 3GPP Draft, 3GPP TSG-RAN WG3 Meeting Ad Hoc, R3-172246, 3rd Generation Partnership Project (3GPP), Mobile Competence Centre, 650, Route Des Lucioles, F-06921 Sophia-Antipolis Cedex, France, vol. RAN WG3, No. Qingdao, Jun. 27, 2017-Jun. 29, 2017, Jun. 26, 2017 (Jun. 26, 2017), XP051302192, 4 pages, Retrieved from the Internet: URL: http://www.3gpp.org/ftp/Meetings_3GPP_SYNC/RAN3/Docs/. [retrieved on Jun. 26, 2017] paragraph [0003].

Zte, et al., "Discussion on IAB Node Discovery and Selection", 3GPP Draft, 3GPP TSG-RAN WG2#104, R2-1817418, Discussion on IAB Node Discovery and Selection, 3rd Generation Partnership Project (3GPP), Mobile Competence Centre, 650, Route Des Lucioles, F-06921 Sophia-Antipolis Cedex, France, vol. RAN WG2, No. Spokane, USA, Nov. 12, 2018-Nov. 16, 2018, Nov. 2, 2018 (Nov. 2, 2018), XP051481323, 8 pages, Retrieved from the Internet: URL: http://www.3gpp.org/ftp/tsg%5Fran/WG2%5FRL2/TSGR2%5F104/Docs/R2%2D1817418%2Ezip. [retrieved on Nov. 2, 2018] paragraphs [02 .1]-[2 .2.], [09. 3] figures 1, 9.3-1,9.3-2(a).

\* cited by examiner

RESOURCE UTILIZATION BASED EVENT TRIGGERING IN WIRELESS COMMUNICATIONS

CROSS REFERENCE

The present application for patent claims the benefit of U.S. Provisional Patent Application No. 62/760,000 by ISLAM, et al., entitled "RESOURCE UTILIZATION BASED EVENT TRIGGERING IN WIRELESS COMMUNICATIONS," filed Nov. 12, 2018, assigned to the assignee hereof, and expressly incorporated by reference herein.

BACKGROUND

The following relates generally to wireless communications, and more specifically to resource utilization based event triggering in wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems (e.g., 5G new radio (NR) systems), infrastructure and spectral resources for NR access may additionally support wireless backhaul link capabilities in supplement to wireline backhaul connections, providing an integrated access and backhaul (IAB) network architecture. One or more base stations may include centralized units (CUs) and distributed units (DUs) and may be referred to as donor base stations. One or more DUs associated with a donor base station may be partially controlled by CUs associated with the donor base station. The one or more donor base stations (e.g., IAB donors) may be in communication with one or more additional base stations (e.g., IAB nodes) via supported access and backhaul links. IAB nodes may support mobile terminal (MT) functionality controlled and/or scheduled by DUs of a coupled IAB donor, as well as DUs relative to additional entities (e.g., IAB nodes, UEs, etc.) within the relay chain or configuration of the access network (e.g., downstream).

In such IAB systems, some nodes may provide access links to one or more UEs, and other nodes may provide backhaul links between other nodes without providing access to any UEs. Data for nodes with access traffic may, in some cases, traverse across one or more donor IAB nodes to an anchor node that has a fiber connection with a core network. The network may select the one or more donor IAB nodes for a path between the access node and anchor node based on various parameters, such as channel conditions that are associated with each node. The reporting of channel conditions of each node may impact network decisions on donor nodes to select for access traffic. In such systems, processes for node selection by the network may be deficient.

SUMMARY

The described techniques relate to improved methods, systems, devices, and apparatuses that support resource utilization based event triggering in wireless communications. According to various aspects, a wireless node in a wireless communications system may establish a connection with a core network via a path that includes one or more relay nodes. In some cases, the wireless node may determine that a network load associated with one or more paths between the wireless node and the core network has changed, or that a difference between two or more network loads of different paths has changed. Based on such a determination, the wireless node may transmit a report to the network. In some cases, the network may receive the report from the wireless node, and may initiate a path change based on the report. In some cases, the network may configure different reporting mechanisms (e.g., different maximum numbers of neighboring node measurements to report) for nodes that provide access links and for nodes that operate in backhaul links.

A method of wireless communication is described. The method may include establishing, at a first node, a connection with a core network via a first path that includes at least a first relay node in a wireless communications network, identifying, at the first node, at least a second path available for the connection with the core network that includes at least a second relay node, determining a first network load associated with the first path and a second network load associated with the second path, and transmitting a report to the core network based on a difference between the first network load and the second network load or a change in one or more of the first network load or the second network load.

An apparatus for wireless communication is described. The apparatus may include a processor, memory in electronic communication with the processor, and instructions stored in the memory. The instructions may be executable by the processor to cause the apparatus to establish, at a first node, a connection with a core network via a first path that includes at least a first relay node in a wireless communications network, identify, at the first node, at least a second path available for the connection with the core network that includes at least a second relay node, determine a first network load associated with the first path and a second network load associated with the second path, and transmit a report to the core network based on a difference between the first network load and the second network load or a change in one or more of the first network load or the second network load.

Another apparatus for wireless communication is described. The apparatus may include means for establishing, at a first node, a connection with a core network via a first path that includes at least a first relay node in a wireless communications network, identifying, at the first node, at least a second path available for the connection with the core network that includes at least a second relay node, determining a first network load associated with the first path and a second network load associated with the second path, and transmitting a report to the core network based on a difference between the first network load and the second network load or a change in one or more of the first network load or the second network load.

A non-transitory computer-readable medium storing code for wireless communication is described. The code may include instructions executable by a processor to establish, at a first node, a connection with a core network via a first path that includes at least a first relay node in a wireless communications network, identify, at the first node, at least a second path available for the connection with the core network that includes at least a second relay node, determine a first network load associated with the first path and a second network load associated with the second path, and transmit a report to the core network based on a difference between the first network load and the second network load or a change in one or more of the first network load or the second network load.

In some examples of the method, apparatuses, and non-transitory computer-readable medium described herein, the first node connects with the core network via an anchor node in the wireless communications network. Some examples of the method, apparatuses, and non-transitory computer-readable medium described herein may further include operations, features, means, or instructions for receiving, from the core network responsive to the report, an indication to switch the connection with the core network from the first path to the second path. In some examples of the method, apparatuses, and non-transitory computer-readable medium described herein, the first node, the first relay node, and the second relay node may be IAB nodes, and where one or more IAB nodes may be incorporated in one of more base stations in the wireless communications network.

In some examples of the method, apparatuses, and non-transitory computer-readable medium described herein, the first network load and the second network load may be determined based on one or more of a congestion of one or more nodes within the first path or the second path, a congestion of one or more links within the first path or the second path, a resource utilization of one or more nodes within the first path or the second path, a resource utilization of one or more links within the first path or the second path, a number of other nodes connected with an anchor node via one or more nodes within the first path or the second path, or any combinations thereof.

Some examples of the method, apparatuses, and non-transitory computer-readable medium described herein may further include operations, features, means, or instructions for receiving, at the first node, configuration information that includes network load information associated with one or more nodes within the wireless communications network, the one or more nodes including the first relay node and the second relay node.

Some examples of the method, apparatuses, and non-transitory computer-readable medium described herein may further include operations, features, means, or instructions for measuring one or more channel conditions associated with at least the first relay node and the second relay node, and determining to switch the connection with the core network to the second path based on the measured one or more channel conditions and the configured network load information. In some examples of the method, apparatuses, and non-transitory computer-readable medium described herein, the one or more channel conditions include a reference signal received power (RSRP), a reference signal received quality (RSRQ), a signal to interference and noise ratio (SINR), or any combinations thereof. In some examples of the method, apparatuses, and non-transitory computer-readable medium described herein, the report includes a measurement report including the one or more channel conditions to initiate a switch of the connection with the core network from the first path to the second path. Some examples of the method, apparatuses, and non-transitory computer-readable medium described herein may further include operations, features, means, or instructions for transmitting an adjusted network load report responsive to determining a change in one or more of the first network load, the second network load, or a difference between the first and second network load. In some examples of the method, apparatuses, and non-transitory computer-readable medium described herein, the determining may be based on configuration information that includes network load information of a most congested node in each of at least the first path and the second path. In some examples of the method, apparatuses, and non-transitory computer-readable medium described herein, the first node includes a UE or a mobile termination (MT) function within the wireless communications network.

A method of wireless communication is described. The method may include establishing, at a network node that serves two or more child nodes through two or more different paths in a wireless communications network, a connection with a MT function via a first child node and a first path, configuring the MT function with a network configuration, where the network configuration includes network load information associated with the first path and at least a second path of the two or more different paths, and receiving, at the network node, a report from the MT function that indicates a change in the network load of one or more of the first path, the second path, or a difference in network loads between the first path and the second path.

An apparatus for wireless communication is described. The apparatus may include a processor, memory in electronic communication with the processor, and instructions stored in the memory. The instructions may be executable by the processor to cause the apparatus to establish, at a network node that serves two or more child nodes through two or more different paths in a wireless communications network, a connection with a MT function via a first child node and a first path, configure the MT function with a network configuration, where the network configuration includes network load information associated with the first path and at least a second path of the two or more different paths, and receive, at the network node, a report from the MT function that indicates a change in the network load of one or more of the first path, the second path, or a difference in network loads between the first path and the second path.

Another apparatus for wireless communication is described. The apparatus may include means for establishing, at a network node that serves two or more child nodes through two or more different paths in a wireless communications network, a connection with a MT function via a first child node and a first path, configuring the MT function with a network configuration, where the network configuration includes network load information associated with the first path and at least a second path of the two or more different paths, and receiving, at the network node, a report from the MT function that indicates a change in the network load of one or more of the first path, the second path, or a difference in network loads between the first path and the second path.

A non-transitory computer-readable medium storing code for wireless communication is described. The code may include instructions executable by a processor to establish, at a network node that serves two or more child nodes through two or more different paths in a wireless communications network, a connection with a MT function via a first child node and a first path, configure the MT function with a network configuration, where the network configuration includes network load information associated with the first path and at least a second path of the two or more different paths, and receive, at the network node, a report from the MT function that indicates a change in the network load of one or more of the first path, the second path, or a difference in network loads between the first path and the second path.

In some examples of the method, apparatuses, and non-transitory computer-readable medium described herein, the first child node connects with the network node via an anchor node in the wireless communications network. Some examples of the method, apparatuses, and non-transitory computer-readable medium described herein may further include operations, features, means, or instructions for transmitting, responsive to the report from the MT function, an indication to the MT function to switch the connection with the network node from the first path to the second path. In some examples of the method, apparatuses, and non-transitory computer-readable medium described herein, the one or more child nodes may be integrated access and backhaul (IAB) nodes, and where one or more IAB nodes may be incorporated in one of more base stations in the wireless communications network.

In some examples of the method, apparatuses, and non-transitory computer-readable medium described herein, the network configuration indicates that the report from the MT function may be to be triggered based on one or more of a congestion of one or more nodes within the first path or the second path, a congestion of one or more links within the first path or the second path, a resource utilization of one or more nodes within the first path or the second path, a resource utilization of one or more links within the first path or the second path, a number of other nodes connected with an anchor node via one or more nodes within the first path or the second path, or any combinations thereof.

Some examples of the method, apparatuses, and non-transitory computer-readable medium described herein may further include operations, features, means, or instructions for receiving, from the MT function, a measurement report including one or more channel conditions measured at the MT function, the measurement report transmitted responsive to switching of the connection from the first path to the second path. In some examples of the method, apparatuses, and non-transitory computer-readable medium described herein, the one or more channel conditions include a RSRP, a RSRQ, a SINR, or any combinations thereof. Some examples of the method, apparatuses, and non-transitory computer-readable medium described herein may further include operations, features, means, or instructions for receiving, from the MT function, an adjusted network load report that indicates a change in network load of one or more of the child nodes, or a difference between two or more network loads. In some examples of the method, apparatuses, and non-transitory computer-readable medium described herein, the network configuration further includes network load information of a most congested node in each of at least the first path and the second path.

A method of wireless communication is described. The method may include establishing, at a first node, a connection with a core network via a first path that includes at least a first relay node within an IAB network, transmitting capability information to the core network that indicates whether the first node is a UE node or a MT function of an IAB node, receiving, from the core network, configuration information that indicates a first reporting scheme of two or more available reporting schemes for transmitting a report to the core network, and transmitting at least a first report via the first relay node according to the first reporting scheme.

An apparatus for wireless communication is described. The apparatus may include a processor, memory in electronic communication with the processor, and instructions stored in the memory. The instructions may be executable by the processor to cause the apparatus to establish, at a first node, a connection with a core network via a first path that includes at least a first relay node within an IAB network, transmit capability information to the core network that indicates whether the first node is a UE node or a MT function of an IAB node, receive, from the core network, configuration information that indicates a first reporting scheme of two or more available reporting schemes for transmitting a report to the core network, and transmit at least a first report via the first relay node according to the first reporting scheme.

Another apparatus for wireless communication is described. The apparatus may include means for establishing, at a first node, a connection with a core network via a first path that includes at least a first relay node within an IAB network, transmitting capability information to the core network that indicates whether the first node is a UE node or a MT function of an IAB node, receiving, from the core network, configuration information that indicates a first reporting scheme of two or more available reporting schemes for transmitting a report to the core network, and transmitting at least a first report via the first relay node according to the first reporting scheme.

A non-transitory computer-readable medium storing code for wireless communication is described. The code may include instructions executable by a processor to establish, at a first node, a connection with a core network via a first path that includes at least a first relay node within an IAB network, transmit capability information to the core network that indicates whether the first node is a UE node or a MT function of an IAB node, receive, from the core network, configuration information that indicates a first reporting scheme of two or more available reporting schemes for transmitting a report to the core network, and transmit at least a first report via the first relay node according to the first reporting scheme.

In some examples of the method, apparatuses, and non-transitory computer-readable medium described herein, the configuration information indicates a first maximum number of neighboring nodes that may be to be reported for UE nodes, and a second maximum number of neighboring nodes that may be to be reported for MT functions. In some examples of the method, apparatuses, and non-transitory computer-readable medium described herein, the configuration information indicates a medium access control (MAC) control element (MAC-CE) message that may be to be used by each child node for transmitting an associated report, and where different MAC-CE message formats support reports for UE nodes and MT functions. In some examples of the method, apparatuses, and non-transitory computer-readable medium described herein, the different MAC-CE message formats include MAC-CE messages with different lengths.

A method of wireless communication is described. The method may include establishing, at a network, a set of connections with a set of child nodes in the network, receiving capability information from the set of child nodes, transmitting different mobility report configurations to different subsets of the set of child nodes based on the received capability information, where the different mobility report configurations contain different reporting information among one or more of child UE nodes or child MT functions of one or more IAB nodes within the set of child nodes, and receiving a set of reports from the set of child nodes based on the mobility report configurations.

An apparatus for wireless communication is described. The apparatus may include a processor, memory in electronic communication with the processor, and instructions stored in the memory. The instructions may be executable by the processor to cause the apparatus to establish, at a network, a set of connections with a set of child nodes in the network, receive capability information from the set of child nodes, transmit different mobility report configurations to different subsets of the set of child nodes based on the received capability information, where the different mobility report configurations contain different reporting information among one or more of child UE nodes or child MT functions of one or more IAB nodes within the set of child nodes, and receive a set of reports from the set of child nodes based on the mobility report configurations.

Another apparatus for wireless communication is described. The apparatus may include means for establishing, at a network, a set of connections with a set of child nodes in the network, receiving capability information from the set of child nodes, transmitting different mobility report configurations to different subsets of the set of child nodes based on the received capability information, where the different mobility report configurations contain different reporting information among one or more of child UE nodes or child MT functions of one or more IAB nodes within the set of child nodes, and receiving a set of reports from the set of child nodes based on the mobility report configurations.

A non-transitory computer-readable medium storing code for wireless communication is described. The code may include instructions executable by a processor to establish, at a network, a set of connections with a set of child nodes in the network, receive capability information from the set of child nodes, transmit different mobility report configurations to different subsets of the set of child nodes based on the received capability information, where the different mobility report configurations contain different reporting information among one or more of child UE nodes or child MT functions of one or more IAB nodes within the set of child nodes, and receive a set of reports from the set of child nodes based on the mobility report configurations.

In some examples of the method, apparatuses, and non-transitory computer-readable medium described herein, the configuration information indicates a first maximum number of neighboring nodes that may be to be reported for child UE nodes, and a second maximum number of neighboring nodes that may be to be reported for child MT functions. In some examples of the method, apparatuses, and non-transitory computer-readable medium described herein, the different mobility report configurations indicate a first maximum number of neighboring nodes that may be to be reported for child nodes that provide an access link, and a second maximum number of neighboring nodes that may be to be reported for child nodes that provide a backhaul link.

In some examples of the method, apparatuses, and non-transitory computer-readable medium described herein, the configuration information indicates a MAC-CE message that may be to be used by each child node for transmitting an associated report, and where different MAC-CE message formats support reports for child UE nodes and child MT functions. In some examples of the method, apparatuses, and non-transitory computer-readable medium described herein, the different MAC-CE messages include MAC-CE messages with different lengths. In some examples of the method, apparatuses, and non-transitory computer-readable medium described herein, the capability information identifies whether each child node may be a UE or an MT function.

DETAILED DESCRIPTION

Figure 1:
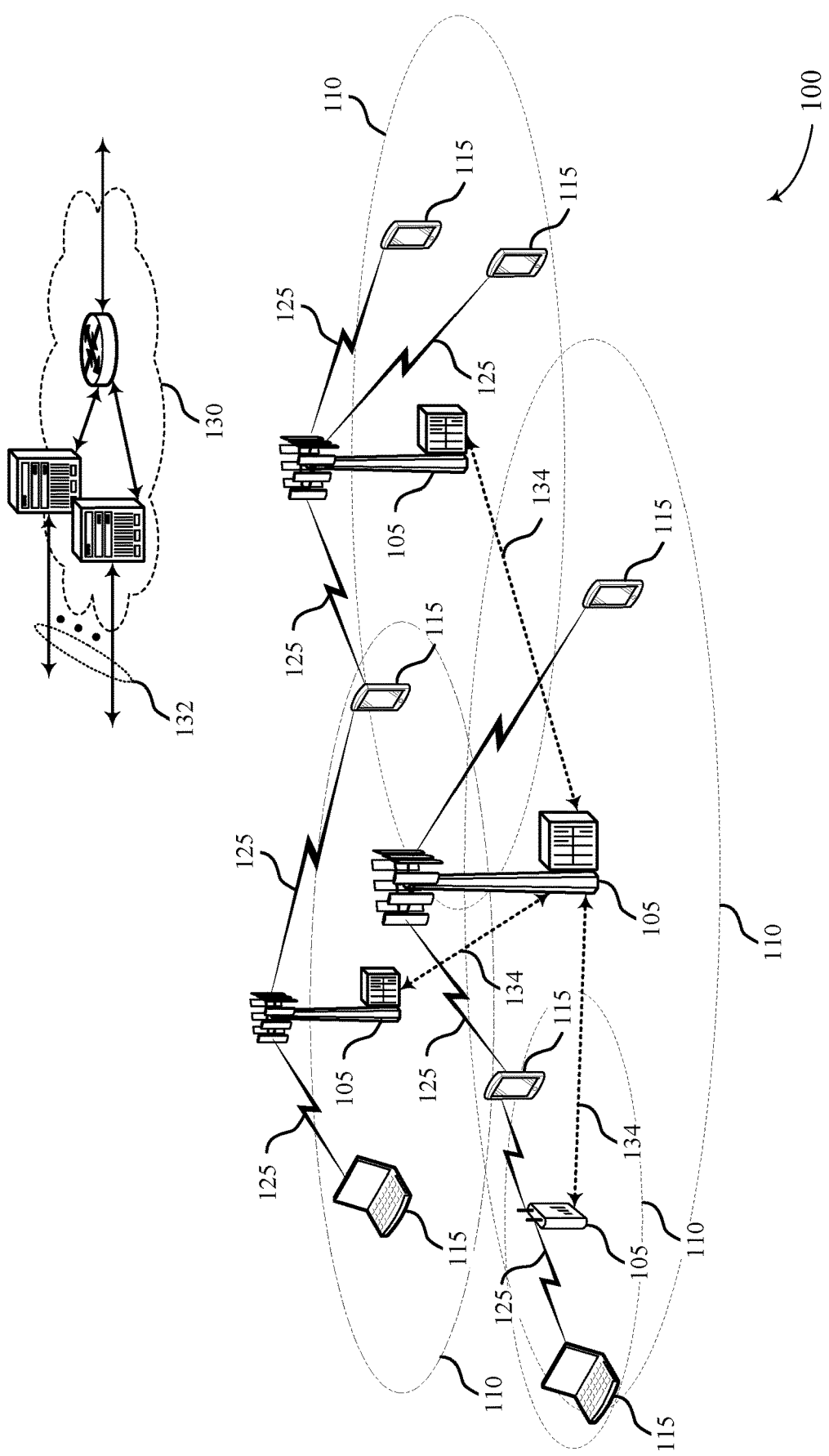
FIG. 1 illustrates an example of a system for wireless communications that supports resource utilization based event triggering in wireless communications in accordance with aspects of the present disclosure.

Various aspects of the present disclosure provide techniques that support resource utilization based event triggering in wireless communications. In some cases, a wireless node in a wireless communications system may establish a connection with a core network via a path that includes one or more relay nodes, such as through one or more donor integrated access and backhaul (IAB) nodes in an IAB network. In some cases, the wireless node may determine that a network load associated with one or more paths between the wireless node and the core network has changed, or that a difference between two or more network loads of different paths has changed. Based on such a determination, the wireless node may transmit a report to the network. In some cases, the network may receive the report from the wireless node, and may initiate a path change based on the report. In some cases, the network may configure different reporting mechanisms (e.g., different maximum numbers of neighboring node measurements to report) for nodes that provide access links and for nodes that operate in backhaul links.

As indicated above, in some wireless communications systems (e.g., 5G or new radio (NR) systems), infrastructure and spectral resources for system access may support wireless backhaul link capabilities in supplement to wireline backhaul connections, providing an IAB network architecture. One or more base stations may include centralized units (CUs) and distributed units (DUs) and may be referred to as donor base stations (e.g., or IAB donors). One or more DUs associated with a donor base station may be partially controlled by CUs associated with the donor base station. A base station CU may be a component of a database, data center, core network, or network cloud. A network node associated with a radio access technology (RAT) may communicate with a donor base station CU via a backhaul link (e.g., wireline backhaul, or wireless backhaul). The one or more donor base stations (e.g., IAB donors) may be in communication with one or more additional base stations (e.g., IAB nodes or relay nodes) and user equipment (UE). In some cases, IAB nodes may support a mobile termination (MT) function that may be controlled and scheduled by an IAB donor and/or parent IAB nodes relative to the MT supported IAB nodes, as well as DU operability relative to additional entities (e.g., IAB nodes, UEs, etc.) within the relay chain or configuration of the access network (e.g., downstream). For example, an IAB network architecture may include a chain or path of connected wireless devices (e.g., starting with a donor base station or anchor node, and ending with a user equipment (UE), with any number of IAB relay nodes in between) via link resources that support access and backhaul capabilities (e.g., a wireline backhaul, or wireless backhaul).

A relay node may refer to an intermediary node in a relay (e.g., an IAB relay) chain. For example, a relay node may relay communications between a parent node (e.g., an IAB donor or anchor node, or an IAB node upstream or higher on the relay chain) and a child node (e.g., an IAB node downstream or lower on the relay chain). In some cases, the relay node may refer to the DU or access node function (AN-F) of an intermediary IAB node. A child node may refer to an IAB-Node (e.g., the CU/MT of the IAB-Node) or a UE that is the child of another IAB-Node (e.g., such as the relay node) or an IAB-donor (e.g., the DU/AN-F of the IAB-Node or IAB-Donor). A parent node in communication with the relay node may refer to an upstream IAB-Node or an IAB-donor (e.g., the DU/AN-F of the IAB-Node or IAB-Donor). In some cases, a parent node may be referred to as a control node (e.g., a control node may refer to a parent node or a DU of a parent node in communication with an MT of a relay node or other intermediary IAB node).

The IAB network architecture may support increased backhaul density within the relay chain, to compensate for mobile capacity density within the one or more service cells corresponding to base stations (e.g., IAB donors, IAB nodes) supported on the network. For example, several IAB nodes may each be in communication with one or more UEs, and the IAB nodes may be controlled and scheduled by one or more DUs via backhaul links. In some cases, a single backhaul connection may support multiple RATs and aid in improving spectral gains.

In some cases, when initially accessing a network, a node (e.g., a UE or MT function of an IAB node) may select a parent node. Such a selection may be based on measured signal characteristics (e.g., reference signal received power (RSRP), reference signal received quality (RSRQ), signal to interference and noise (SINR), etc.) of multiple candidate parent nodes. The UE/MT may initiate a random access procedure with the selected node to establish a radio resource control (RRC) connection with the parent node, after which the UE/MT may be referred to as being in a connected mode. In connected mode, the network may decide whether to change one or more access paths between the UE/MT and the network, with such decisions based at least in part on one or more measurement reports associated with available nodes in the system. Such measurement reports may be event triggered or periodic, and may include one or more measured parameters, such as RSRP, RSRQ, SINR, etc. In some cases, a measurement report (or other type of event) may be triggered based on measured parameters meeting some established criteria for a measurement report transmission. The network, upon receipt of such a report, may initiate a change that may provide more efficient usage of network resources.

In some cases, the established criteria for triggering a report (or other type of event such as an initiation of a handover, etc.) may include measurement values that meet a threshold (e.g., a signal strength of a neighboring node exceeding a signal strength of a serving node). In one specific example for a NR network, as specified in 3GPP TS 38.331 (release 15) v.115.3.0, measurement report triggering may be based on six events identified as A1 through A6 as follows, in which RSRP, RSRQ and SINR of a serving cell, special cell (SpCell), and one or more neighbor cells, are used as metrics to define events:

A1: Serving becomes better than threshold
A2: Serving becomes worse than threshold
A3: Neighbor becomes offset better than SpCell
A4: Neighbor becomes better than threshold
A5: SpCell becomes worse than threshold1 and neighbor becomes better than threshold2
A6: Neighbor becomes offset better than SCell.

An excerpt of 3GPP TS 38.331, sections 5.5.4.2 through 5.5.4.7 that specifies events A1 through A6, recites:

5.5.4.2 Event A1 (Serving Becomes Better than Threshold)

The UE shall:
1> consider the entering condition for this event to be satisfied when condition A1-1, as specified below, is fulfilled;
1> consider the leaving condition for this event to be satisfied when condition A1-2, as specified below, is fulfilled;
1> for this measurement, consider the NR serving cell corresponding to the associated measObjectNR associated with this event.

Inequality A1-1 (Entering condition)

$Ms-Hys>Thresh$

Inequality A1-2 (Leaving condition)

$Ms+Hys<Thresh$

The variables in the formula are defined as follows:
Ms is the measurement result of the serving cell, not taking into account any offsets.
Hys is the hysteresis parameter for this event (i.e. hysteresis as defined within reportConfigNR for this event).

Thresh is the threshold parameter for this event (i.e. a1-Threshold as defined within reportConfigNR for this event).
Ms is expressed in dBm in case of RSRP, or in dB in case of RSRQ and RS-SINR.
Hys is expressed in dB.
Thresh is expressed in the same unit as Ms.

5.5.4.3 Event A2 (Serving Becomes Worse than Threshold)

The UE shall:
1> consider the entering condition for this event to be satisfied when condition A2-1, as specified below, is fulfilled;
1> consider the leaving condition for this event to be satisfied when condition A2-2, as specified below, is fulfilled;
1> for this measurement, consider the serving cell indicated by the measObjectNR associated to this event.

Inequality A2-1 (Entering condition)

$$Ms+Hys<Thresh$$

Inequality A2-2 (Leaving condition)

$$Ms-Hys>Thresh$$

The variables in the formula are defined as follows:
Ms is the measurement result of the serving cell, not taking into account any offsets.
Hys is the hysteresis parameter for this event (i.e. hysteresis as defined within reportConfigNR for this event).
Thresh is the threshold parameter for this event (i.e. a2-Threshold as defined within reportConfigNR for this event).
Ms is expressed in dBm in case of RSRP, or in dB in case of RSRQ and RS-SINR.
Hys is expressed in dB.
Thresh is expressed in the same unit as Ms.

5.5.4.4 Event A3 (Neighbour Becomes Offset Better than SpCell)

The UE shall:
1> consider the entering condition for this event to be satisfied when condition A3-1, as specified below, is fulfilled;
1> consider the leaving condition for this event to be satisfied when condition A3-2, as specified below, is fulfilled;
1> use the SpCell for Mp, Ofp and Ocp.
NOTE The cell(s) that triggers the event has reference signals indicated in the measObjectNR associated to this event which may be different from the NR SpCell-measObjectNR.

Inequality A3-1 (Entering condition)

$$Mn+Ofn+Ocn-Hys>Mp+Ofp+Ocp+Off$$

Inequality A3-2 (Leaving condition)

$$Mn+Ofn+Ocn+Hys<Mp+Ofp+Ocp+Off$$

The variables in the formula are defined as follows:
Mn is the measurement result of the neighbouring cell, not taking into account any offsets.
Ofn is the measurement object specific offset of the reference signal of the neighbour cell (i.e. offsetMO as defined within measObjectNR corresponding to the neighbour cell).
Ocn is the cell specific offset of the neighbour cell (i.e. cellIndividualOffset as defined within measObjectNR corresponding to the frequency of the neighbour cell), and set to zero if not configured for the neighbour cell.
Mp is the measurement result of the SpCell, not taking into account any offsets.
Ofp is the measurement object specific offset of the SpCell (i.e. offsetMO as defined within measObjectNR corresponding to the SpCell).
Ocp is the cell specific offset of the SpCell (i.e. cellIndividualOffset as defined within measObjectNR corresponding to the SpCell), and is set to zero if not configured for the SpCell.
Hys is the hysteresis parameter for this event (i.e. hysteresis as defined within reportConfigNR for this event).
Off is the offset parameter for this event (i.e. a3-Offset as defined within reportConfigNR for this event).
Mn, Mp are expressed in dBm in case of RSRP, or in dB in case of RSRQ and RS-SINR.
Ofn, Ocn, Ofp, Ocp, Hys, Off are expressed in dB.

5.5.4.5 Event A4 (Neighbour Becomes Better than Threshold)

The UE shall:
1> consider the entering condition for this event to be satisfied when condition A4-1, as specified below, is fulfilled;
1> consider the leaving condition for this event to be satisfied when condition A4-2, as specified below, is fulfilled.

Inequality A4-1 (Entering condition)

$$Mn+Ofn+Ocn-Hys>Thresh$$

Inequality A4-2 (Leaving condition)

$$Mn+Ofn+Ocn+Hys<Thresh$$

The variables in the formula are defined as follows:
Mn is the measurement result of the neighbouring cell, not taking into account any offsets.
Ofn is the measurement object specific offset of the neighbour cell (i.e. offsetMO as defined within measObjectNR corresponding to the neighbour cell).
Ocn is the measurement object specific offset of the neighbour cell (i.e. cellIndividualOffset as defined within measObjectNR corresponding to the neighbour cell), and set to zero if not configured for the neighbour cell.
Hys is the hysteresis parameter for this event (i.e. hysteresis as defined within reportConfigNR for this event).
Thresh is the threshold parameter for this event (i.e. a4-Threshold as defined within reportConfigNR for this event).
Mn is expressed in dBm in case of RSRP, or in dB in case of RSRQ and RS-SINR.
Ofn, Ocn, Hys are expressed in dB.
Thresh is expressed in the same unit as Mn.

5.5.4.6 Event A5 (SpCell Becomes Worse than Threshold1 and Neighbour/SCell Becomes Better than Threshold2)

The UE shall:
1> consider the entering condition for this event to be satisfied when both condition A5-1 and condition A5-2, as specified below, are fulfilled;
1> consider the leaving condition for this event to be satisfied when condition A5-3 or condition A5-4, i.e. at least one of the two, as specified below, is fulfilled;
1> use the SpCell for Mp.
NOTE: The parameters of the reference signal(s) of the cell(s) that triggers the event are indicated in the measObjectNR associated to the event which may be different from the measObjectNR of the NR SpCell.
Inequality A5-1 (Entering condition 1)

Mp+Hys<Thresh1

Inequality A5-2 (Entering condition 2)

Mn+Ofn+Ocn−Hys>Thresh2

Inequality A5-3 (Leaving condition 1)

Mp−Hys>Thresh1

Inequality A5-4 (Leaving condition 2)

Mn+Ofn+Ocn+Hys<Thresh2

The variables in the formula are defined as follows:
Mp is the measurement result of the NR SpCell, not taking into account any offsets.
Mn is the measurement result of the neighbouring cell/SCell, not taking into account any offsets.
Ofn is the measurement object specific offset of the neighbour/SCell cell (i.e. offsetMO as defined within measObjectNR corresponding to the neighbour cell/SCell).
Ocn is the cell specific offset of the neighbour cell/SCell (i.e. cellIndividualOffset as defined within measObjectNR corresponding to the neighbour cell/SCell), and set to zero if not configured for the neighbour cell.
Hys is the hysteresis parameter for this event (i.e. hysteresis as defined within reportConfigNR for this event).
Thresh1 is the threshold parameter for this event (i.e. a5-Threshold) as defined within reportConfigNR for this event).
Thresh2 is the threshold parameter for this event (i.e. a5-Threshold2 as defined within reportConfigNR for this event).
Mn, Mp are expressed in dBm in case of RSRP, or in dB in case of RSRQ and RS-SINR.
Ofn, Ocn, Hys are expressed in dB.
Thresh1 is expressed in the same unit as Mp.
Thresh2 is expressed in the same unit as Mn.

5.5.4.7 Event A6 (Neighbour Becomes Offset Better than SCell)
The UE shall:
1> consider the entering condition for this event to be satisfied when condition A6-1, as specified below, is fulfilled;
1> consider the leaving condition for this event to be satisfied when condition A6-2, as specified below, is fulfilled;
1> for this measurement, consider the (secondary) cell corresponding to the measObjectNR associated to this event to be the serving cell.
NOTE: The reference signal(s) of the neighbour(s) and the reference signal(s) of the SCell are both indicated in the associated measObjectNR.
Inequality A6-1 (Entering condition)

Mn+Ocn−Hys>Ms+Ocs+Off

Inequality A6-2 (Leaving condition)

Mn+Ocn+Hys<Ms+Ocs+Off

The variables in the formula are defined as follows:
Mn is the measurement result of the neighbouring cell, not taking into account any offsets.
Ocn is the cell specific offset of the neighbour cell (i.e. cellIndividualOffset as defined within the associated measObjectNR), and set to zero if not configured for the neighbour cell.
Ms is the measurement result of the serving cell, not taking into account any offsets.
Ocs is the cell specific offset of the serving cell (i.e. cellIndividualOffset as defined within the associated measObjectNR), and is set to zero if not configured for the serving cell.
Hys is the hysteresis parameter for this event (i.e. hysteresis as defined within reportConfigNR for this event).
Off is the offset parameter for this event (i.e. a6-Offset as defined within reportConfigNR for this event).
Mn, Ms are expressed in dBm in case of RSRP, or in dB in case of RSRQ and RS-SINR.
Ocn, Ocs, Hys, Off are expressed in dB.

As indicated, such events are triggered based on RSRP, RSRQ, and SINR. In various aspects of the present disclosure, one or more events may be triggered based on one or more parameters other than RSRP, RSRQ, or SINR. In some cases, a UE or IAB MT function may trigger events based on a load of the network during idle and connected mode. The load of the network may include, for example, one or more combinations of congestion in one or more nodes/links, resource utilization in one or more nodes/links of the network, or a number of UEs/MTs connected to different backhaul nodes of the network. In some cases, the network (e.g., NR core network) may configure a UE/MT with load information in the network (or the load information of a most congested node in the backhaul path of each of its potential neighbors), and the UE/MT may use one or more combinations of measured RSRP, RSRQ, SINR along with the configured load information to trigger events. In some cases, the UE/MT may report one or more combinations of RSRP, RSRQ, or SINR to the network after triggering an event. Additionally or alternatively, the UE/MT may report adjusted load information to the network after triggering an event.

Further, in some cases when an event is triggered, a report may be transmitted to the network. The report may include, for example, one or more measurements (e.g., RSRP, RSRQ, SINR, etc.) for a configured maximum number of neighboring nodes (in addition to a serving node). As discussed above, in some IAB systems, a MT function of an IAB relay node may connect to the network in a same manner as a UE, and may be configured to trigger events in the same manner as a UE. In some aspects of the disclosure, techniques provide that different reporting features may be provided among IAB MTs and UEs. For example, an IAB MT may be configured to report a different maximum number of neighboring node measurements than a UE. In some examples, different medium access control (MAC) control element (MAC-CE) message formats may be provided to support reports with different numbers of neighboring cells (e.g., where different MAC-CE message formats have different lengths).

Techniques such as those discussed herein may allow for more efficient utilization of network resources in networks. In some cases, network load information, such as a capacity of a node in the network, may be provided to a UE/MT as configuration information, and the UE/MT may determine a differential resource utilization based on a capacity of each node that would be used if that node were to carry data of the UE/MT. In cases where the differential resource utilization indicates that a node outside of a current path between the UE/MT and the network would utilize less resources than the current path, an event may be triggered, and a report may be transmitted from the UE/MT to the network. In such cases, the network may determine that a path switch is to be performed, and thus overall network efficiency may be enhanced. Further, having the UE/MT trigger the report based on a local measurement may allow the network to receive information relatively quickly and adapt connections based on relatively up to date information, which may further enhance network efficiency.

Aspects of the disclosure are initially described in the context of a wireless communications system. Various examples of IAB networks and network load based event triggering are then described. Aspects of the disclosure are further illustrated by and described with reference to apparatus diagrams, system diagrams, and flowcharts that relate to resource utilization based event triggering in wireless communications.

FIG. 1 illustrates an example of a wireless communications system 100 that supports resource utilization based event triggering in wireless communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. In some cases, base stations 105 may provide wireline and wireless backhaul links between base stations 105, and access links to UEs 115, in accordance with IAB techniques.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

In some cases, wireless backhaul links 134 may be provided among base stations 105 in an IAB network. For example, base stations 105 may be split into support entities (e.g., functionalities) for promoting wireless backhaul density (e.g., in collaboration with NR communication access). In some cases, one or more base stations 105 may be split into associated base station CU and DU entities, where one or more DUs may be partially controlled by an associated CU. The CU entities of the one or more base stations 105 may facilitate connection between the core network 130 and the AN (e.g., via a wireline or wireless connection to the core network). The DUs of the one or more base stations 105 may control and/or schedule functionality for additional devices (e.g., one or more alternative base stations 105, UEs 115) according to configured access and backhaul links. Based on the supported entities at the one or more base stations 105, the one or more base stations 105 may be referred to as donor base stations (e.g., or IAB donors).

Additionally, in some cases, one or more base stations 105 may be split into associated MT and base station DU entities, where MT functionality of the one or more base stations 105 may be controlled and/or scheduled by the DU entities of the one or more donor base stations (e.g., via a Uu interface). DUs associated with the one or more base stations may be controlled by MT functionality. In addition, DUs of the one or more base stations 105 may be partially controlled by signaling messages from CU entities of associated donor base stations on the configured access and backhaul links of a network connection (e.g., via an F1-application protocol (AP)). The DUs of the one or more base stations 105 may support one of multiple serving cells with associated coverage areas 110 of the network coverage area. The DUs of the one or more base stations 105 may control and/or schedule functionality for additional devices (e.g., one or more alternative base stations 105, UEs 115) according to configured access and backhaul links. Based on the supported entities at the one or more base stations 105, the base stations may be referred to as intermediary base stations (e.g., or IAB nodes).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some wireless communications systems 100, one or more base stations 105 may include CUs and DUs, where one or more DUs associated with a base station may be partially controlled by a CU associated with the base station. The base station CUs may be components of a database, data center, or the core network 130 (e.g., a 5G NR core network (5GC)). A base station CU may communicate with a donor base station 105 via a backhaul link 134 (e.g., a wireline backhaul, or a wireless backhaul). As another example, in IAB networks, a base station CU (e.g., a donor base station 105) may communicate with the core network 130 (e.g., the NGC) via a backhaul link 132 (e.g., a wireline backhaul, or wireless backhaul). For example, an IAB network may include a chain or path of wireless devices (e.g., starting with an anchor base station 105 (a RAN node that terminates an interface with the core network) and ending with a UE 115, with any number of IAB nodes in between. IAB nodes (e.g., relay nodes) may support MT functionality (which may also be referred to as UE function (UE-F)) controlled and scheduled by an IAB donor, or another IAB node, as its parent node as well as DU functionality (which may also be referred to as an access node function (AN-F)) relative to additional entities (e.g., IAB nodes, UEs, etc.) within the relay chain or configuration of the access network (e.g., downstream). These relay mechanisms may forward traffic along to the additional entities, extend the range of wireless access for one or more base stations, enhance the density of backhaul capability within serving cells, etc.

In various aspects of the present disclosure, a UE 115 or a MT function of a base station 105 may trigger one or more events based at least in part on RSRP, RSRQ, SINR, and at least one other parameter. In some cases, a UE 115 or MT function may trigger events based on a load of the network during idle and connected mode. The load of the network may include, for example, one or more combinations of congestion in one or more nodes/links, resource utilization in one or more nodes/links of the network, or a number of UEs 115 or MT functions connected to different backhaul nodes of the network. In some cases, the network (e.g., NR core network 130) may configure a UE 115 or MT function with load information in the network (or the load information of a most congested node in the backhaul path of each of its potential neighbors), and the UE 115 or MT function may use one or more combinations of measured RSRP, RSRQ, SINR along with the configured load information to trigger events. In some cases, the UE 115 or MT function may report one or more combinations of RSRP, RSRQ, or SINR to the network after triggering an event. Additionally or alternatively, the UE 115 or MT function may report adjusted load information to the network after triggering an event.

Further, in some cases when an event is triggered, a report may be transmitted to the network. The report may include, for example, one or more measurements (e.g., RSRP, RSRQ, SINR, etc.) for a configured maximum number of neighboring nodes (in addition to a serving node). As discussed above, in some IAB systems, a MT function of an IAB relay node may connect to the network in a same manner as a UE 115, and may be configured to trigger events in the same manner as a UE 115. In some aspects of the disclosure, techniques provide that different reporting features may be provided among IAB MTs and UEs 115. For example, an IAB MT may be configured to report a different maximum number of neighboring node measurements than a UE 115. In some examples, different medium access control (MAC) control element (MAC-CE) message formats may be provided to support reports with different numbers of neighboring cells (e.g., where different MAC-CE message formats have different lengths).

Figure 2:
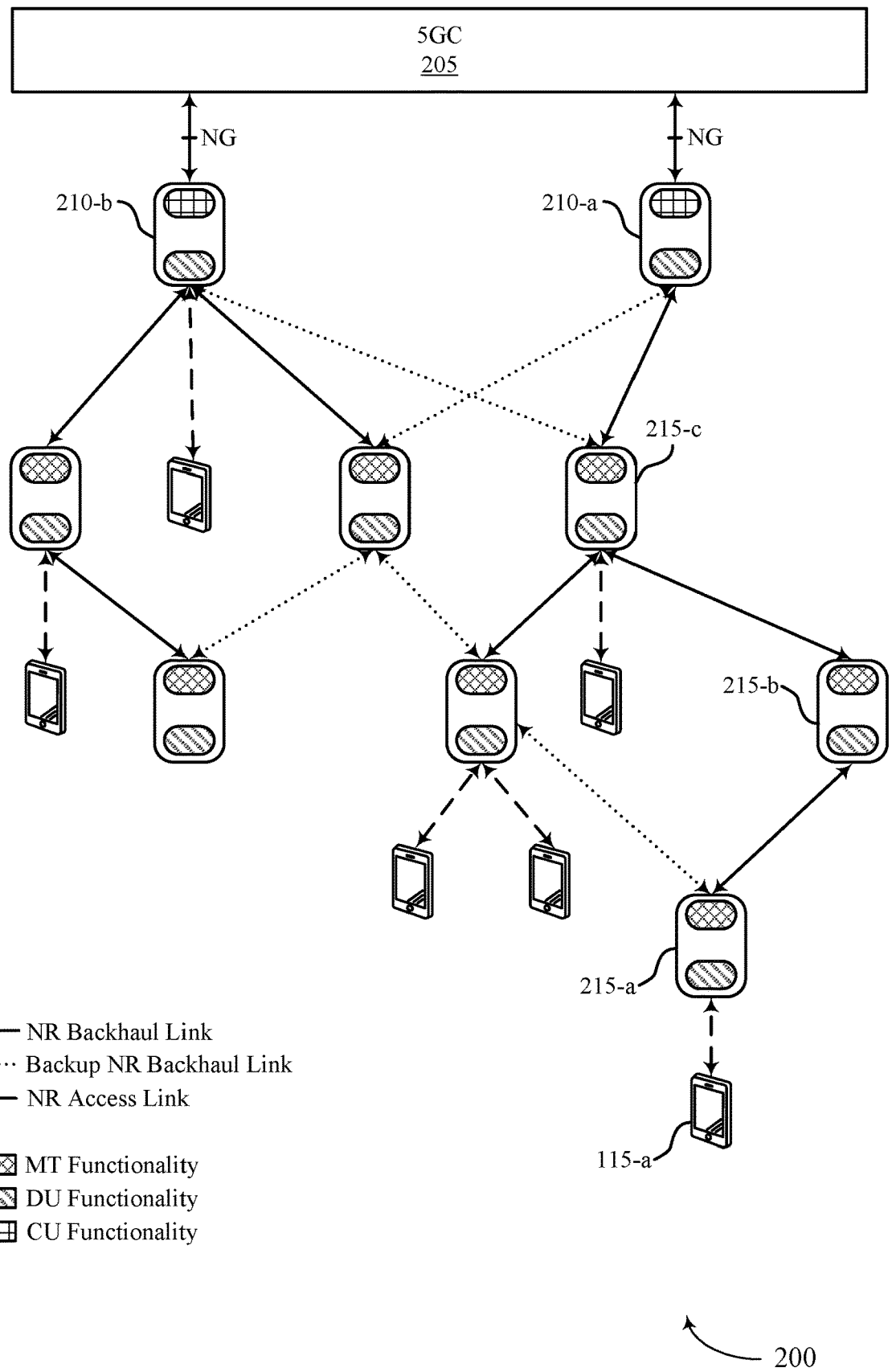
FIG. 2 illustrates an example of a portion of an integrated access and backhaul (IAB) network that supports resource utilization based event triggering in wireless communications in accordance with aspects of the present disclosure.

FIG. 2 illustrates an example of an IAB network 200 that supports resource utilization based event triggering in accordance with aspects of the present disclosure. In some examples, IAB network 200 may implement aspects of wireless communications system 100. In the example of FIG. 2 an IAB network 200 (e.g., a NR system) is illustrated that supports sharing of infrastructure and spectral resources for access with wireless backhaul link capabilities, in supplement to wireline backhaul connections, providing an IAB network architecture. IAB network 200 may include a core network 205 (e.g., 5GC), and base stations or supported devices that are split into one or more support entities (e.g., functionalities) for promoting wireless backhaul density in collaboration with wireless communication access. Aspects of the supporting functionalities of the base stations may be referred to as IAB nodes. In some examples, IAB network 200 may implement aspects of wireless communications system 100 as described with reference to FIG. 1.

IAB network 200 may include one or more IAB anchor nodes 210 split into associated base station CU and DU entities, where one or more DUs associated with an IAB anchor node 210 may be partially controlled by an associated CU. IAB anchor nodes 210 may also be referred to generally as a donor node. CUs of IAB anchor nodes 210 may host layer 2 (L3) (e.g., radio resource control (RRC), service data adaption protocol (SDAP), packet data convergence protocol (PDCP), etc.) functionality and signaling. Further CUs of IAB anchor nodes 210 may communicate with core network 205 over an NG interface (which may be an example of a portion of a backhaul link). DUs may host lower layer, such as layer 1 (L1) and layer 2 (L2) (e.g., radio link control (RLC), media access control (MAC), physical (PHY), etc.) functionality and signaling. A DU entity of IAB anchor node 210 may support one of multiple serving cells of the network coverage according to connections associated with backhaul and access links of the IAB network. DUs of the IAB anchor nodes 210 may control both access links and backhaul links within the corresponding network coverage and provide controlling and scheduling for descendant (e.g., child) IAB nodes 215, UEs 115, or both.

IAB nodes 215 may be split into associated MT and DU entities. MT functionality (e.g., UE-F) of the IAB nodes 215 may be controlled and/or scheduled by antecedent IAB nodes (e.g., by an IAB anchor node 210 or another IAB donor node as its parent node) of the established connectivity via access and backhaul links of a coverage area. DUs associated with an IAB node 215 may be controlled by MT functionality of the node. In addition, DUs of the IAB nodes 215 may be partially controlled by signaling messages from CU entities of associated IAB anchor nodes 210 of the network connection (e.g., via an F1-application protocol (AP)). The DUs of the IAB nodes 215 may support one of multiple serving cells of the network coverage area. DU functionality (e.g., access node function (AN-F)) may schedule child IAB nodes and UEs, and may control both access links and backhaul links under its coverage.

IAB network 200 may employ relay chains, or paths, for communications within the IAB network architecture. For example, UE 115-a may have a path (e.g., a first path) to the core network via a link with a first relay node 215-a, a second relay node 215-b, a third relay node 215-c, and anchor node 210-a. One or more other paths may also be available, and in some cases UE 115-a, or MT function at first relay node 215-a may trigger a reporting event to provide measurement reports for one or more relay nodes 215 in other paths based on configured network loads and one or more local measurements.

In some cases, an IAB anchor node 210 may support primary and one or more secondary (e.g., backup) backhaul links to child IAB nodes 215. The IAB donor may further support one or more access links to additional devices (e.g., UEs 115) or entities of the network. In addition, MT functionality of each of the one or more child IAB nodes 215 and UEs 115 may be configured to support network connectivity to multiple parent nodes via access and backhaul links associated with coverage areas of the IAB network. For example, in some cases an IAB node 215 may be supported by a first (e.g., primary) backhaul link associated with a coverage area and MT functionality may be controlled and/or scheduled by a first parent node. Further, the IAB node 215 may supported by one or more secondary backhaul links associated with a non-collocated coverage area and controlled and/or scheduled by one or more parent nodes. Each of the primary backhaul connections and the one or more secondary connections may support spectral capabilities to provide network communication over one or more RATs. The one or more IAB nodes may further support base station DU entities and may support multiple backhaul and access links within the relay chain. The DU entities may control and/or schedule descendant IAB nodes 215 and UEs 115 within (e.g., downstream) the IAB network via the configured backhaul and access links. That is, an IAB node 215-a may act as a relay between the IAB anchor node 210-a and one or more descendant devices (e.g., IAB node 215-b, or UEs 115) in both communication directions based on established backhaul and access connections.

The supported relay chain or path of IAB network 200, including multiple backhaul and access link connections between IAB anchor nodes 210, IAB nodes 215, and UEs 115 may enhance backhaul density within the coverage areas supported by the network, while achieving resource gains. That is, enhanced backhaul link coverage (e.g., increased backhaul links due to wireless backhaul on NR access technology and resources) within the IAB network 200 may increase supported service capacity density within a coverage area. As a result, network capacity in terms of supported user capacity density may be improved, with enhanced utilization of deployed backhaul spectrum.

Figure 3:
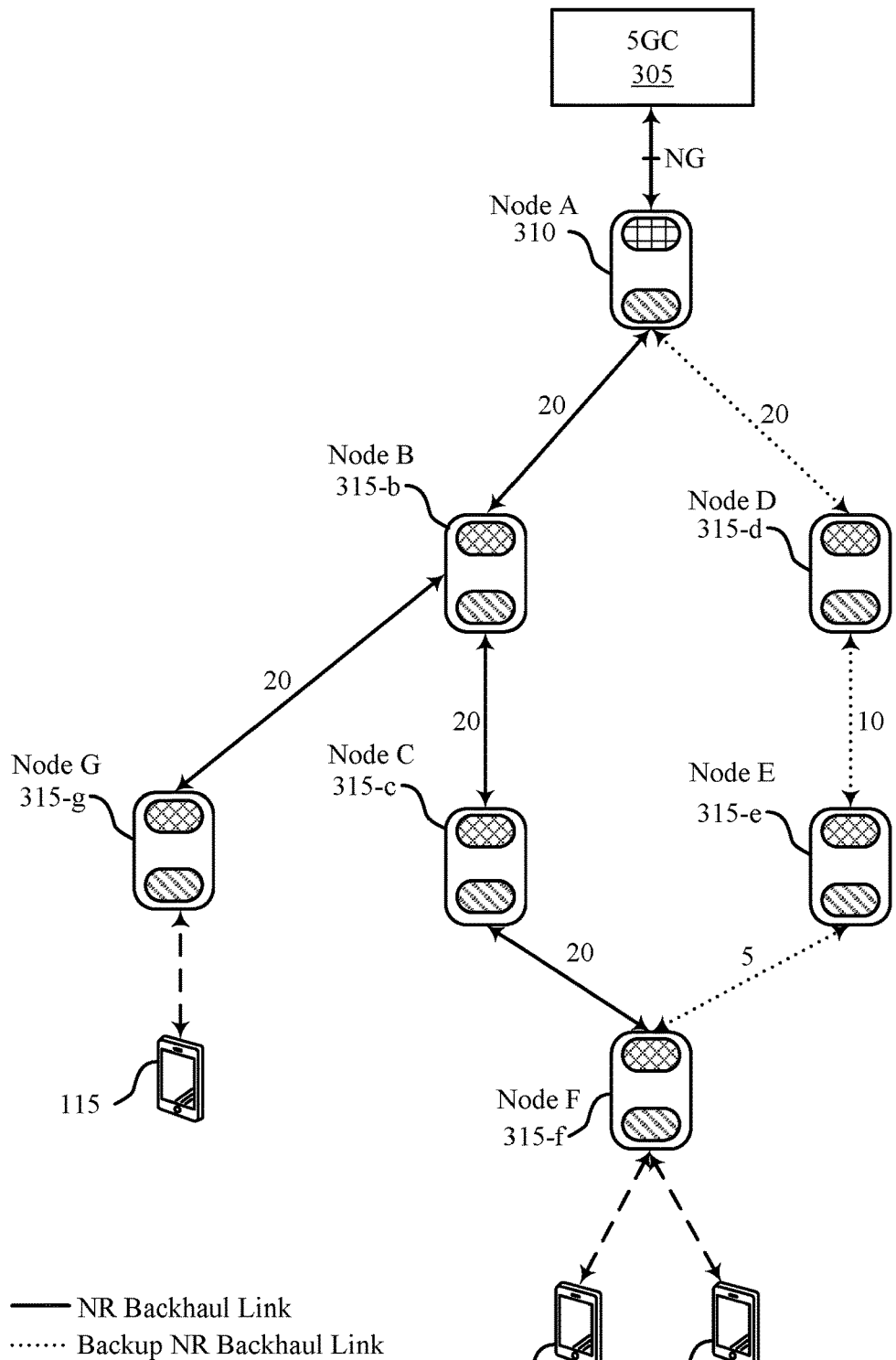
FIGS. 3-6 illustrate examples of network loads in IAB networks that supports resource utilization based event triggering in wireless communications in accordance with aspects of the present disclosure.

FIG. 3 illustrates an example of an IAB network 300 that supports resource utilization based event triggering in wireless communications in accordance with aspects of the present disclosure. In some examples, IAB network 300 may implement aspects of wireless communications system 100 or IAB network 200. In this example, an anchor node 310 (node A) may have a wireline connection (e.g., a fiber NG connection) with a core network 305 (e.g., a 5GC). Further, a number of relay nodes 315 may be present, including a second node 315-b (node B), a third node 315-c (node C), a fourth node 315-d (node D), a fifth node 315-e (node E), a sixth node 315-f (node F), and a seventh node 315-g (node G).

In this example, the node F and node G may provide access links to UEs 115, and may have access traffic, while the other relay nodes 315-b through 315-e do not provide access traffic for purposes of this example. In other cases, one or more of the other relay nodes 315-b through 315-e may provide access links in addition to backhaul links. Further, more or fewer UEs 115, relay nodes 315, and anchor nodes 310 may be present in such a system, and the devices illustrated in FIG. 3 are provided for purposes of illustration and discussion with the understanding that the described techniques may be used in any number of other systems with other configurations.

In this example, a number next to each link provides an indication of a capacity of the link in terms of units of data traffic (e.g., bits, bytes, transport blocks, etc.) per unit of time (e.g., seconds, milliseconds, etc.). Thus, in the example of FIG. 3, the backhaul link between node C and node F may have a link capacity of 20 units of data traffic per second. Additionally, in the examples of FIGS. 3 through 6, it is assumed, for purposes of discussion and illustration only, that each active node (e.g., node F and node G) has one unit of data traffic to be transmitted to the core network 305.

Initially, relay node 315-f (node F) may not have an established connection, and may select relay node 315-c (node C) for a connection establishment (e.g., based on a RSRP-based metric). When node F establishes a connection with node C, a first path may be established through node C, node B, and node A. A second path may also be used through node E, node D, and node A. In some cases, node F may be configured to trigger events in a manner such as discussed above (e.g., based on events A1 through A6 as discussed above). For example, node F may trigger a transmission of a measurement report in event A3 (e.g., event is triggered when neighbor is better than serving) when a link with node E becomes better than the link with node C. In the event that other aspects are assumed to be constant, when the link between node F and node E has better channel quality than the link between node F and node C, a report will be triggered at node F. However, in cases where link capacities, or a network load, is considered along with one or more measured parameters (e.g., a measured RSRP, RSRQ, SINR, or combinations thereof), network efficiency may be improved in some cases by triggering the reporting event even though the channel quality of the link between node F and node E may not be as good as that of the link between node F and node C.

In some cases, an event trigger (e.g., a reporting event trigger) may use a Min-Max resource utilization. For example, a metric may be provided as Min(max $U_j$), where j ranges from 1 to N, N is the number of IAB nodes in the network, and $U_j$ is the resource utilization (or network load) at IAB node j. To determine if an event is triggered, a node (e.g., node F) may identify the network load associated with nodes in each potential path, determine a maximum network load within each path, and trigger an event in cases where a different path than a currently utilized path has a lower maximum network load. An example of such a determination is illustrated in Table 1 for the example of FIG. 3.

TABLE 1

Resource Utilization at IAB Nodes

| 1. Node | 2. Current Resource Utilization | 3. Differential Resource Utilization | 4. Total Resource Utilization (if node F's data flow through this node) (2 + 3) |
| --- | --- | --- | --- |
| A | 0.05 | 0.05 | 0.1 |
| B | 0.1 | 0.1 | 0.2 |
| C | 0 | 0.1 | 0.1 |
| D | 0 | 0.15 | 0.15 |
| E | 0 | 0.3 | 0.3 |

In this example, a current resource utilization is provided for each of nodes A through E in the second column of Table 1. A differential resource utilization is provided in the third column of Table 1, that corresponds to an additional amount of resource that would be needed if node F's traffic is added to a respective node's load. Thus, in the example of FIG. 3, prior to the addition of node F, node A may have a resource utilization of 0.05, which corresponds to one unit of data traffic from node B divided by the link capacity of 20 units of data per second. At node B, the corresponding resource utilization prior to the addition of node F would be 0.1, which corresponds to one unit of data traffic from node G divided by the link capacity of 20 units of data per second, plus one unit of data traffic from node B to node A divided by the link capacity of 20 units of data per second (e.g., 0.05+0.05). In this example, prior to the addition of node F, node C, node D, and node E will have a resource utilization of zero.

The third column of Table 1 provides a differential resource utilization for each node, which corresponds to additional resource utilization at each node if the traffic of node F were to be added. Finally, the fourth column of Table 1 provides a total resource utilization for each node if node F were to be added (e.g., column 2 plus column 3). In this example, the first path with node C may still have a most efficient connection with node F after it is added, as the highest resource utilization in the first path (e.g., the utilization of 0.2 at node B) is smaller than the highest resource utilization in the second path (e.g., the utilization of 0.3 at node E). In some cases, if a link quality between node F and node E improves enough to support a data capacity of 15 data units per second, the second path may provide a more efficient connection. Such a situation is illustrated and discussed with respect to FIGS. 4 and 5.

Figure 4:
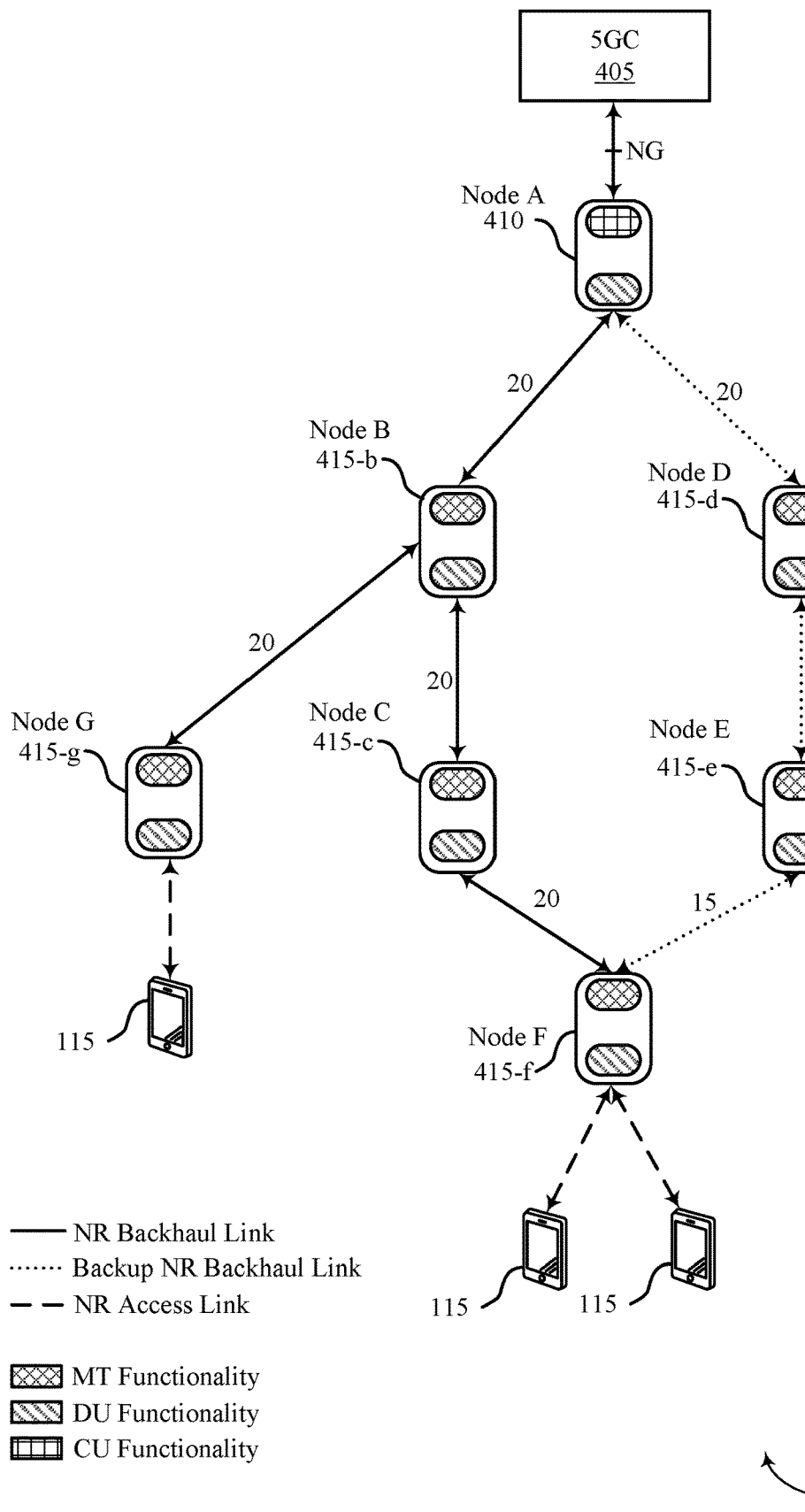

FIG. 4 illustrates an example of an IAB network 400 that supports resource utilization based event triggering in wireless communications in accordance with aspects of the present disclosure. In some examples, IAB network 400 may implement aspects of wireless communications system 100 or IAB network 200 or 300. In this example, a same set of devices as in FIG. 3 are illustrated, including core network 305, anchor node 310, relay nodes 315, and UEs 115. In this example, a channel quality between node F and node E may have increased relative to that of FIG. 3, and in this example may support a link capacity of 15 data units per second. Table 2 provides resource utilization for the nodes in a same format as Table 1:

TABLE 2

Resource Utilization at IAB Nodes with Improved
Link Capacity Between Node E and Node F

| 1. Node | 2. Current Resource Utilization | 3. Differential Resource Utilization | 4. Total Resource Utilization (if F's data flow through this node) (2 + 3) |
|---|---|---|---|
| A | 0.1 | 0 | 0.1 |
| B | 0.2 | 0 | 0.2 |
| C | 0.1 | 0 | 0.1 |
| D | 0 | 0.15 | 0.15 |
| E | 0 | 0.1667 | 0.1667 |

In this example, with the increased link capacity for the link between node E and node F, the differential resource utilization of node E becomes 0.1667 (e.g., $1/15+1/10$). In this example, the second path have a most efficient connection with node C after it is added, as the highest resource utilization in the first path (e.g., the utilization of 0.2 at node B) is greater than the highest resource utilization in the second path (e.g., the utilization of 0.1667 at node E). In such a case, event A3 would not be triggered, but a network resource-based event may be triggered, and node F may initiate a transmission of a report based on this event. In some cases, one or more additional event triggers (e.g., event A7, event A8, etc., may be included with events A1-A6), which trigger events based on network load in combination with one or more channel quality measurements. In some cases, node F may trigger such an event and transmit a measurement report to the core network 405. The core network 405 may, responsive to the measurement report, initiate a path switch for node F from the first path to the second path, such as is illustrated in FIG. 5.

Figure 5:
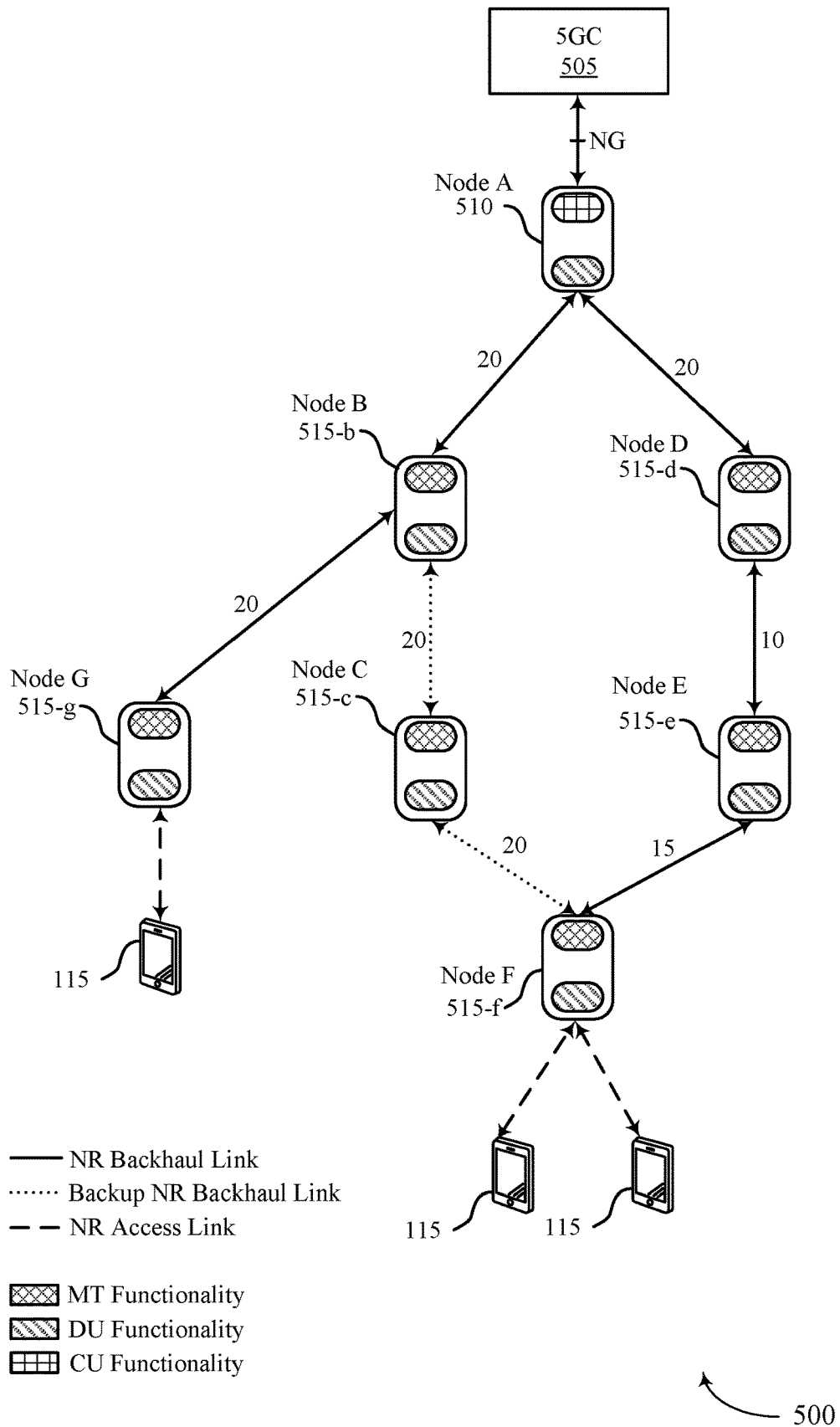

FIG. 5 illustrates an example of an IAB network 500 that supports resource utilization based event triggering in wireless communications in accordance with aspects of the present disclosure. In some examples, IAB network 500 may implement aspects of wireless communications system 100 or IAB network 200, 300, or 400. In this example, a same set of devices as in FIGS. 3 and 4 are illustrated, including core network 505, anchor node 510, relay nodes 515, and UEs 115. In this example, the second path between the anchor node 510 and node F is established, and includes node D and node E.

In some cases, relay nodes 515 may receive configuration from the core network 505 that includes network utilization information for one or more other relay nodes in the IAB network 500. Further, the relay nodes 515 may perform certain channel measurements (e.g., RSRP, RSRQ, SINR) for a serving node and one or more neighboring nodes. The channel measurements, in conjunction with the configured network utilization information, may be used to determine total resource utilization and Min(max $U_j$). Table 3 provides resource utilization for the nodes in a same format as Table 1:

TABLE 3

Parameters for Resource Utilization Based Event Triggering

| 1. Node | 2. Current Resource Utilization | 3. Differential Resource Utilization |
|---|---|---|
| A | 0.1 | 0 |
| B | 0.2 | 0 |
| C | 0.1 | $0/20 + 0/C_{CF}$ |
| D | 0 | 0.15 |
| E | 0 | $1/10 + 1/C_{EF}$ |

In this example, parameter $C_{CF}$ corresponds to the link capacity between node C and node F, parameter $C_{EF}$ corresponds to the link capacity between node E and node F. Each of parameters $C_{CF}$ and $C_{EF}$ may be determined at node F, such as based on RSRP, RSRQ, SINR, or combinations thereof, which may be used to determine supported data rates of these links and the associated link capacity. In some cases, the core network 505 may provide configuration information that includes other parameters of Table 3, such as the current resource utilization of nodes A through E, a link capacity links between nodes, an indication of a path in which a node resides, or any combinations thereof. Some parameters may be transparent to node F and known to the core network 505, such as current resource utilization at node A. While FIGS. 3 through 5 show two relay nodes between an access node and an anchor node, other numbers of relay nodes 515 may be present and may use techniques as discussed herein. For example FIG. 6 shows multiple relay nodes in a path between a UE 115 and core network 505.

Figure 6:
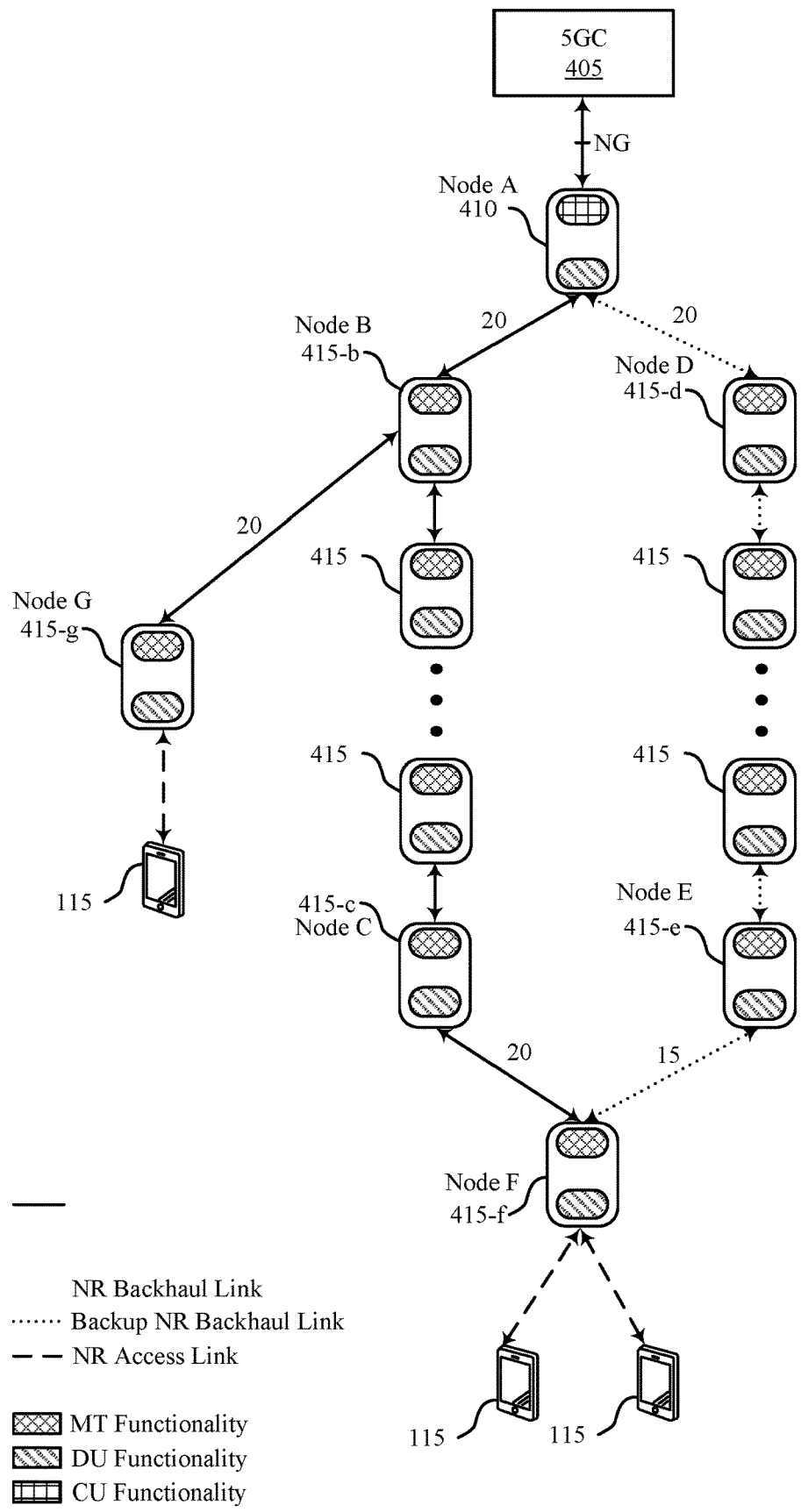

FIG. 6 illustrates an example of an IAB network 600 that supports resource utilization based event triggering in wireless communications in accordance with aspects of the present disclosure. In some examples, IAB network 600 may implement aspects of wireless communications system 100. In this example, a same set of devices as in FIGS. 3, 4, and 5 are illustrated, including core network 605, anchor node 610, relay nodes 615, and UEs 115. In this example, multiple paths may be available between the anchor node 610 and node F, which may include a number of relay nodes 615. In such cases, the MT function at node F may be configured with network utilization information, link capacity information, and the like, for each of the intervening relay nodes between node F and the core network 605. In some cases, parent node information for each relay node 615 may be provided, which may be used to identify one or more paths between node F and the anchor node 610.

Further, the relay nodes 515 may perform certain channel measurements (e.g., RSRP, RSRQ, SINR) for a serving node and one or more neighboring nodes. The channel measurements, in conjunction with the configured network utilization information, may be used to determine total resource utilization and Min(max $U_j$). Table 4 provides resource utilization for the nodes in a same format as above:

TABLE 4

Parameters for Resource Utilization Based Event Triggering

| 1. Node | 2. Current Resource Utilization | 3. Differential Resource Utilization |
|---|---|---|
| A | 0.1 | 0 |
| B | 0.2 | 0 |
| C | 0.1 | $0/20 + 0/C_{CF}$ |
| ... | ... | ... |
| D | 0 | 0.15 |
| E | 0 | $1/10 + 1/C_{EF}$ |
| ... | ... | ... |

In this example, similarly as with Table 3, parameter $C_{CF}$ corresponds to the link capacity between node C and node F, parameter $C_{EF}$ corresponds to the link capacity between node E and node F. Each of parameters $C_{CF}$ and $C_{EF}$ may be determined at node F, such as based on RSRP, RSRQ, SINR, or combinations thereof, which may be used to determine supported data rates for these links and the associated link capacity. In some cases, the core network 605 may provide configuration information that includes other parameters of Table 4, such as the current resource utilization of nodes A through E plus the other relay nodes 615 that may be intervening, a link capacity links between nodes, an indication of a path in which a node resides, or any combinations thereof. Some parameters may be transparent to node F and known to the core network 605, such as current resource utilization at node A.

In some cases, the core network 605 may configure each relay node 615 with only the current and differential resource utilization of the most congested node in the backhaul path of each relay node's 615 potential parent cells, as well as a current and differential resource utilization of the upstream path of each relay node's 615 potential parent cells. In such a manner, the Min(max $U_j$) may be determined without having to compute differential and total link capacities for each intervening node.

In some cases, the load associated each relay node 615 may include, for example, one or more combinations of congestion in the one or more nodes/links, resource utilization in the one or more nodes/links of the network, or a number of UEs/MTs connected to each relay node 615. In some cases, the core network 605 may configure a UE/MT with load information in the network (or the load information of a most congested node in the backhaul path of each of its potential neighbors), and the UE/MT may use one or more combinations of measured RSRP, RSRQ, SINR along with the configured load information to trigger events. In some cases, the UE/MT may report one or more combinations of RSRP, RSRQ, or SINR to the core network 605 after triggering an event. Additionally or alternatively, the UE/MT may report adjusted load information to the core network 605 after triggering an event.

Figure 7:
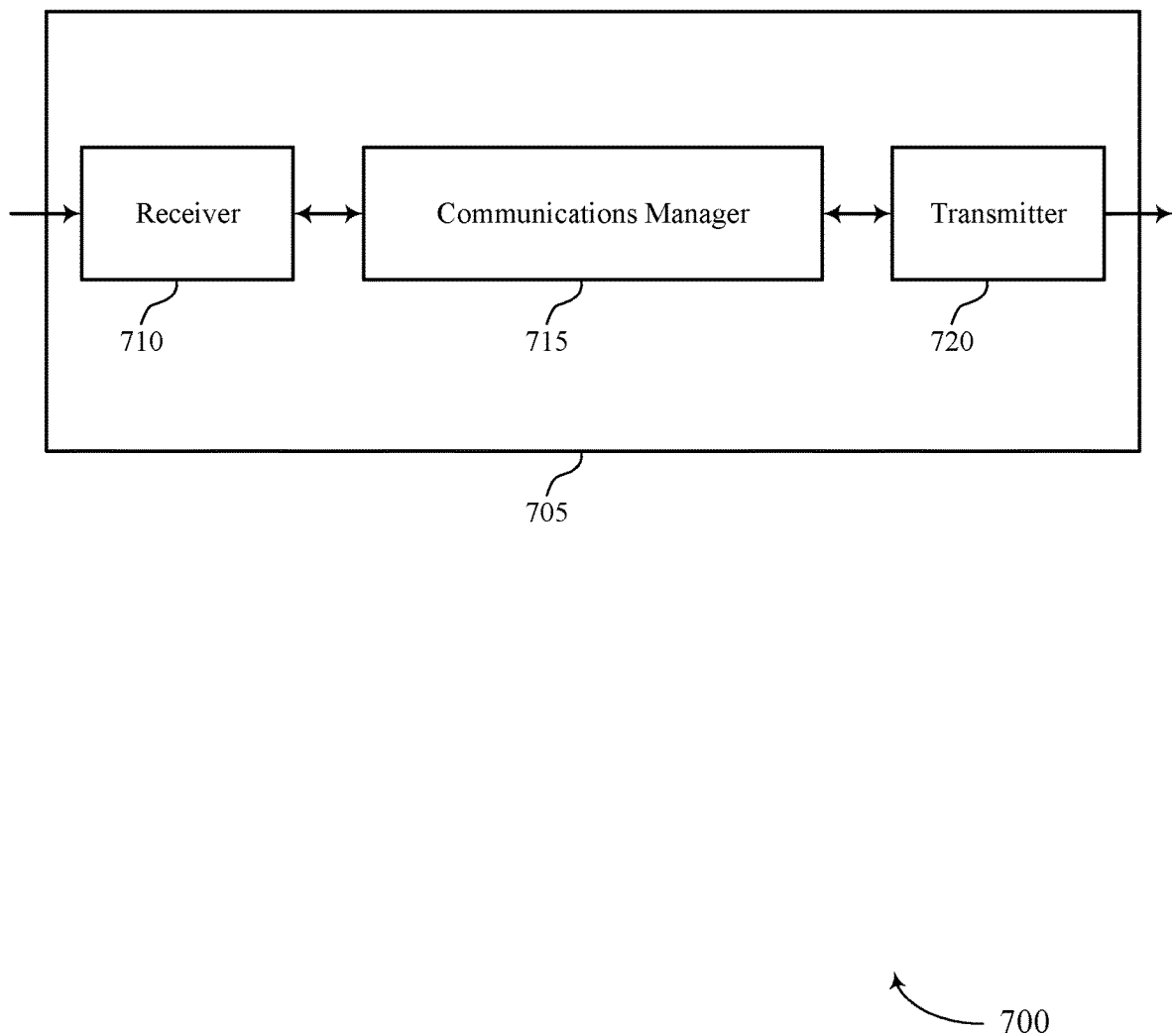
FIGS. 7 and 8 show block diagrams of devices that support resource utilization based event triggering in wireless communications in accordance with aspects of the present disclosure.

FIG. 7 shows a block diagram 700 of a device 705 that supports resource utilization based event triggering in wireless communications in accordance with aspects of the present disclosure. The device 705 may be an example of aspects of a UE 115 or base station 105 as described herein. The device 705 may include a receiver 710, a communications manager 715, and a transmitter 720. The device 705 may also include a processor. Each of these components may be in communication with one another (e.g., via one or more buses).

Receiver 710 may receive information such as packets, user data, or control information associated with various information channels (e.g., control channels, data channels, and information related to resource utilization based event triggering in wireless communications, etc.). Information may be passed on to other components of the device 705. The receiver 710 may be an example of aspects of the transceiver 1020 or 1120 as described with reference to FIGS. 10 and 11. The receiver 710 may utilize a single antenna or a set of antennas.

The communications manager 715 may establish a connection with a core network via a first path that includes at least a first relay node in a wireless communications network, identify at least a second path available for the connection with the core network that includes at least a second relay node, determine a first network load associated with the first path and a second network load associated with the second path, and transmit a report to the core network based on a difference between the first network load and the second network load or a change in one or more of the first network load or the second network load.

The communications manager 715 may also establish a connection with a core network via a first path that includes at least a first relay node within an IAB network, transmit capability information to the core network that indicates whether the device is a UE node or a MT function of an IAB node, receive, from the core network, configuration information that indicates a first reporting scheme of two or more available reporting schemes for transmitting a report to the core network, and transmit at least a first report via the first relay node according to the first reporting scheme. The communications manager 715 may be an example of aspects of the communications manager 1010 or 1110 as described herein. In some examples, the capability information may indicate a configuration of the node, a feature of the node or the status of the node, for example.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 720 may transmit signals generated by other components of the device 705. In some examples, the transmitter 720 may be collocated with a receiver 710 in a transceiver module. For example, the transmitter 720 may be an example of aspects of the transceiver 1020 or 1120 as described with reference to FIGS. 10 and 11. The transmitter 720 may utilize a single antenna or a set of antennas.

Figure 8:
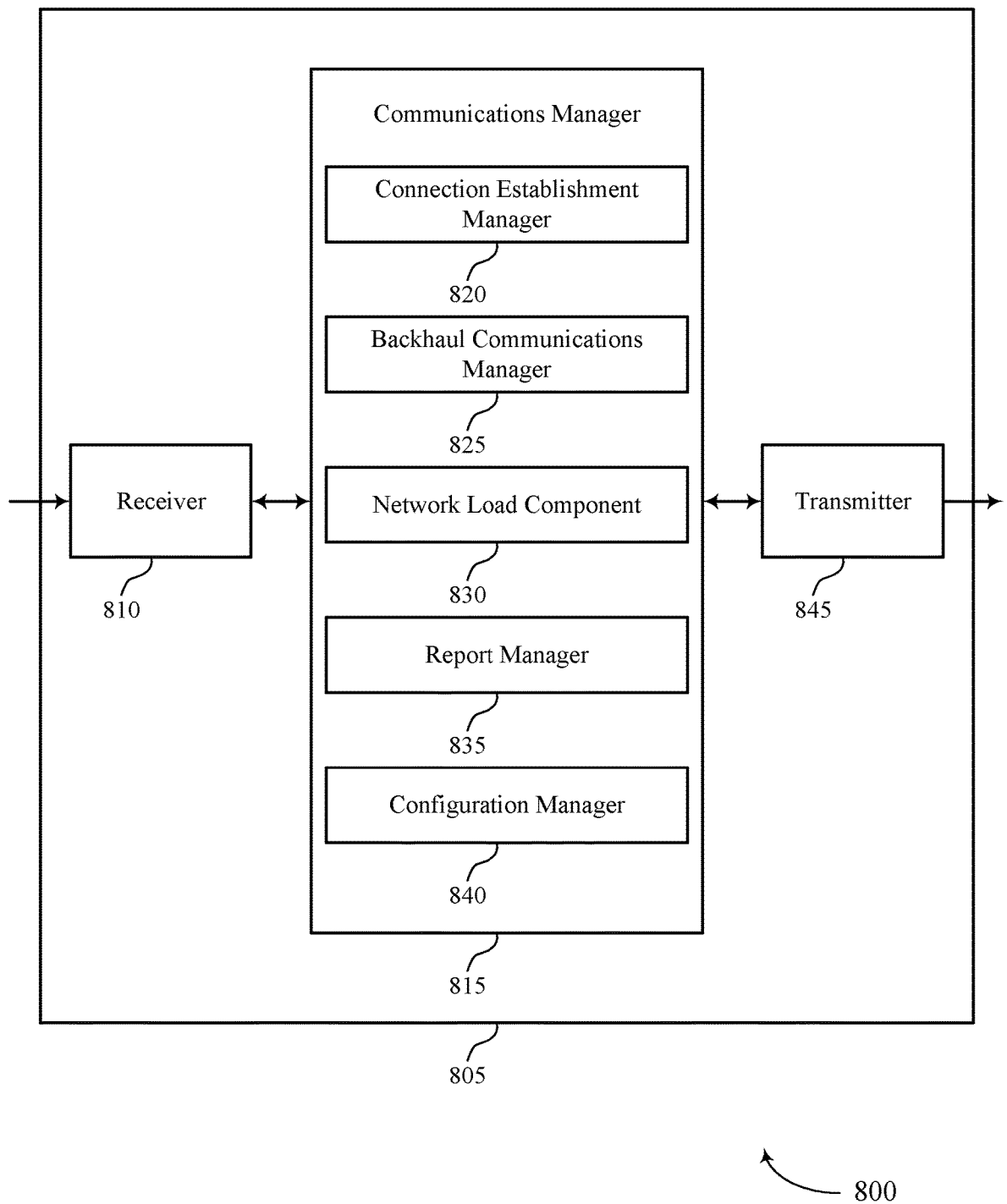

FIG. 8 shows a block diagram 800 of a device 805 that supports resource utilization based event triggering in wireless communications in accordance with aspects of the present disclosure. The device 805 may be an example of aspects of a device 705, a UE 115, or a base station 105 as described herein. The device 805 may include a receiver 810, a communications manager 815, and a transmitter 845. The device 805 may also include a processor. Each of these components may be in communication with one another (e.g., via one or more buses).

Receiver 810 may receive information such as packets, user data, or control information associated with various information channels (e.g., control channels, data channels, and information related to resource utilization based event triggering in wireless communications, etc.). Information may be passed on to other components of the device 805. The receiver 810 may be an example of aspects of the transceiver 1020 or 1120 as described with reference to FIGS. 10 and 11. The receiver 810 may utilize a single antenna or a set of antennas.

The communications manager 815 may be an example of aspects of the communications manager 715 as described herein. The communications manager 815 may include a connection establishment manager 820, a backhaul communications manager 825, a network load component 830, a report manager 835, and a configuration manager 840. The communications manager 815 may be an example of aspects of the communications manager 1010 or 1110 as described herein.

The connection establishment manager 820 may establish a connection with a core network via a first path that includes at least a first relay node in a wireless communications network (e.g., an IAB network).

The backhaul communications manager 825 may identify at least a second path available for the connection with the core network that includes at least a second relay node. In some cases, the backhaul communications manager 825 may transmit at least a first report via the first relay node according to a first reporting scheme of two or more configured reporting schemes (e.g., based on whether the node is a relay node MT or UE).

The network load component 830 may determine a first network load associated with the first path and a second network load associated with the second path.

The report manager 835 may transmit a report to the core network based on a difference between the first network load and the second network load or a change in one or more of the first network load or the second network load.

The configuration manager 840 may receive, from the core network, configuration information that indicates a first reporting scheme of two or more available reporting schemes for transmitting a report to the core network.

Transmitter 845 may transmit signals generated by other components of the device 805. In some examples, the transmitter 845 may be collocated with a receiver 810 in a transceiver module. For example, the transmitter 845 may be an example of aspects of the transceiver 1020 or 1120 as described with reference to FIGS. 10 and 11. The transmitter 845 may utilize a single antenna or a set of antennas.

In some examples, communications manager 815 may be implemented as an integrated circuit or chipset for a mobile device modem, and the receiver 810 and transmitter 820 may be implemented as analog components (e.g., amplifiers, filters, antennas, etc.) coupled with the mobile device modem to enable wireless transmission and reception.

The communications manager 815 as described herein may be implemented to realize one or more potential advantages. Various implementations may increase backhaul density within a relay chain to compensate for mobile capacity density within one or more service cells, which may reduce latency at device 805 that comprises communications manager 815. At least one implementation may enable the communications manager 815 to effectively receive a measurement report to initiate a change in the system that may provide more efficient use of network resources.

Based on implementing the event triggering techniques as described herein, one or more processors of the device 805 (e.g., processor(s) controlling or incorporated with one or more of receiver 810, communications manager 815, and transmitter 820) may improve communication quality by implementing assessment of channel conditions for node selection.

Figure 9:
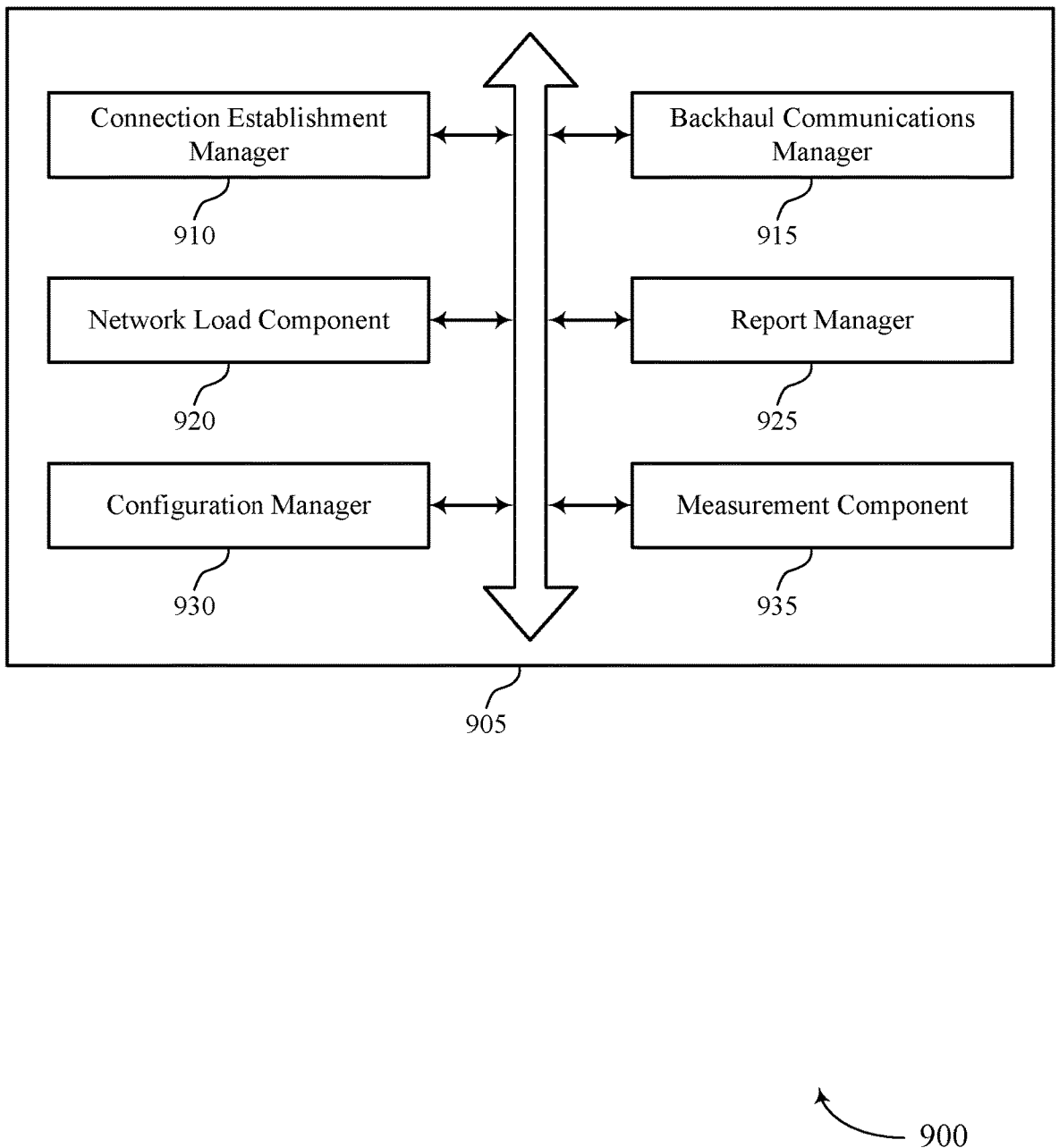
FIG. 9 shows a block diagram of a communications manager that supports resource utilization based event triggering in wireless communications in accordance with aspects of the present disclosure.

FIG. 9 shows a block diagram 900 of a communications manager 905 that supports resource utilization based event triggering in wireless communications in accordance with aspects of the present disclosure. The communications manager 905 may be an example of aspects of a communications manager 715, a communications manager 815, or a communications manager 1010 described herein. The communications manager 905 may include a connection establishment manager 910, a backhaul communications manager 915, a network load component 920, a report manager 925, a configuration manager 930, and a measurement component 935. Each of these modules may communicate, directly or indirectly, with one another (e.g., via one or more buses).

The connection establishment manager 910 may establish a connection with a core network via a first path that includes at least a first relay node in a wireless communications network. In some examples, the connection establishment manager 910 may establish a connection with a core network via a first path that includes at least a first relay node in an IAB network. In some cases, the first node connects with the core network via an anchor node in the wireless communications network. In some cases, the first node, the first relay node, and the second relay node are IAB nodes, and where one or more IAB nodes may be incorporated in one of more base stations in the wireless communications network. In some cases, the first node includes a UE or a MT function within the wireless communications network.

The backhaul communications manager 915 may identify at least a second path available for the connection with the core network that includes at least a second relay node. In some examples, the backhaul communications manager 915 may transmit at least a first report via the first relay node according to the first reporting scheme. In some examples, the backhaul communications manager 915 may receive, from the core network responsive to the report, an indication to switch the connection with the core network from the first path to the second path. In some examples, the backhaul communications manager 915 may transmit an adjusted network load report responsive to determining a change in one or more of the first network load, the second network load, or a difference between the first and second network load.

The network load component 920 may determine a first network load associated with the first path and a second network load associated with the second path. In some cases, the first network load and the second network load are determined based on one or more of a congestion of one or more nodes within the first path or the second path, a congestion of one or more links within the first path or the second path, a resource utilization of one or more nodes within the first path or the second path, a resource utilization of one or more links within the first path or the second path, a number of other nodes connected with an anchor node via one or more nodes within the first path or the second path, or any combinations thereof. In some cases, the determining is based on configuration information that includes network load information of a most congested node in each of at least the first path and the second path.

The report manager 925 may transmit a report to the core network based on a difference between the first network load and the second network load or a change in one or more of the first network load or the second network load.

The configuration manager 930 may receive, from the core network, configuration information that indicates a first reporting scheme of two or more available reporting schemes for transmitting a report to the core network. In some examples, the configuration manager 930 may receive configuration information that includes network load information associated with one or more nodes within the wireless communications network, the one or more nodes including the first relay node and the second relay node. In some cases, the configuration information indicates a first maximum number of neighboring nodes that are to be reported when the first node provides an access link, and a second maximum number of neighboring nodes that are to be reported when the first node provides a backhaul link.

In some cases, the configuration information indicates a MAC-CE message that is to be used for transmitting the first report, and where different MAC-CE messages support reports for different numbers of measured neighboring nodes. In some cases, the different MAC-CE messages include MAC-CE messages with different lengths.

The measurement component 935 may measure one or more channel conditions associated with at least the first relay node and the second relay node. In some examples, the measurement component 935 may determine to switch the connection with the core network to the second path based on the measured one or more channel conditions and the configured network load information. In some cases, the one or more channel conditions include a reference signal received power (RSRP), a reference signal received quality (RSRQ), a signal to interference and noise ratio (SINR), or any combinations thereof. In some cases, the report includes a measurement report including the one or more channel conditions to initiate a switch of the connection with the core network from the first path to the second path.

Figure 10:
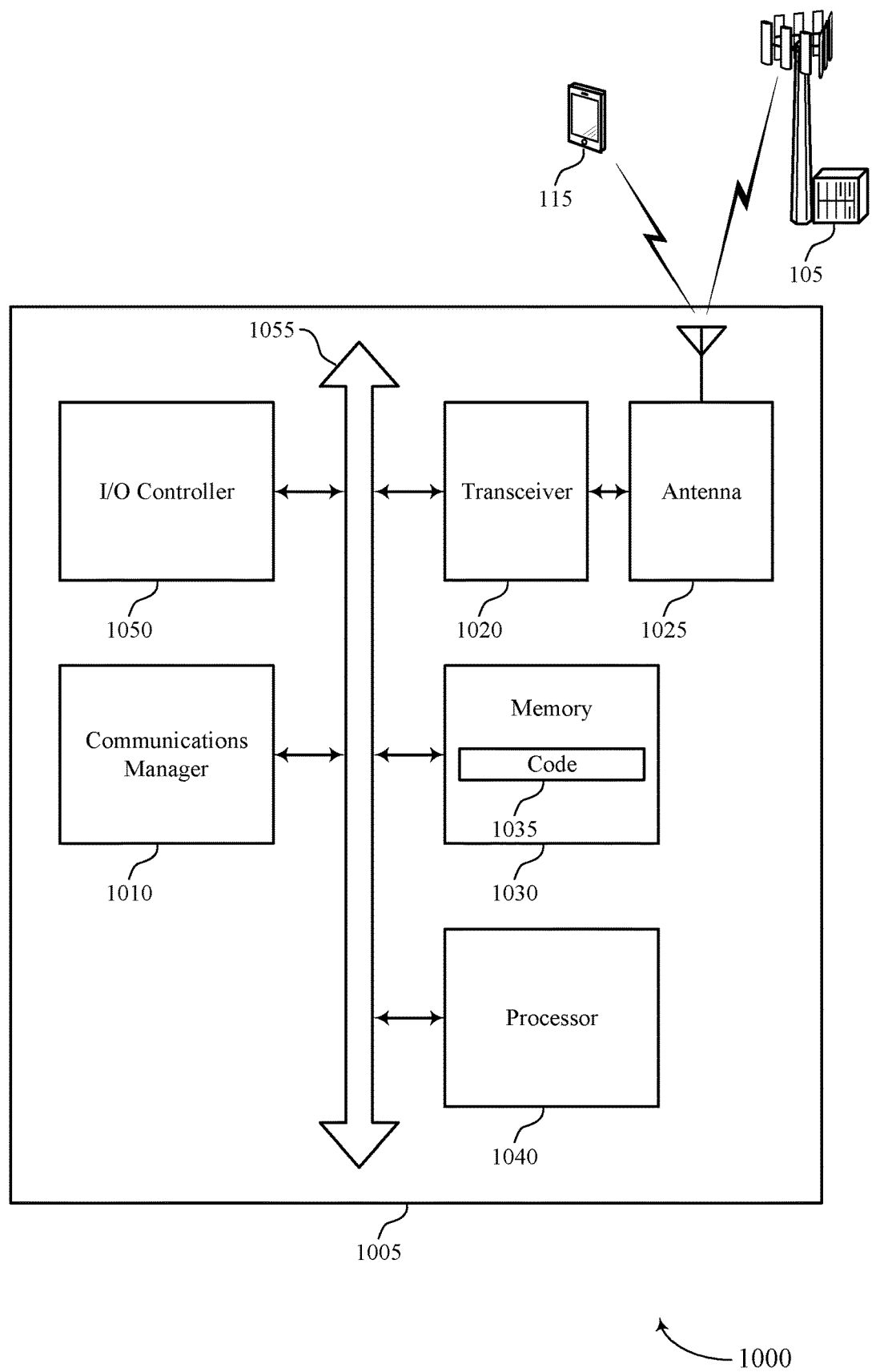
FIG. 10 shows a diagram of a system including a user equipment (UE) that supports resource utilization based event triggering in wireless communications in accordance with aspects of the present disclosure.

FIG. 10 shows a diagram of a system 1000 including a device 1005 that supports resource utilization based event triggering in wireless communications in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, a transceiver 1020, an antenna 1025, memory 1030, a processor 1040, and an I/O controller 1050. These components may be in electronic communication via one or more buses (e.g., bus 1055).

The communications manager 1010 may establish a connection with a core network via a first path that includes at least a first relay node in a wireless communications network, identify at least a second path available for the connection with the core network that includes at least a second relay node, determine a first network load associated with the first path and a second network load associated with the second path, and transmit a report to the core network based on a difference between the first network load and the second network load or a change in one or more of the first network load or the second network load.

The communications manager 1010 may also establish a connection with a core network via a first path that includes at least a first relay node within an IAB network, transmit capability information to the core network that indicates whether the device is a UE node or a MT function of an IAB node, receive, from the core network, configuration information that indicates a first reporting scheme of two or more available reporting schemes for transmitting a report to the core network, and transmit at least a first report via the first relay node according to the first reporting scheme.

Transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM, ROM, or a combination thereof. The memory 1030 may store computer-readable code 1035 including instructions that, when executed by a processor (e.g., the processor 1040) cause the device to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting resource utilization based event triggering in wireless communications).

The I/O controller 1050 may manage input and output signals for the device 1005. The I/O controller 1050 may also manage peripherals not integrated into the device 1005. In some cases, the I/O controller 1050 may represent a physical connection or port to an external peripheral. In some cases, the I/O controller 1050 may utilize an operating system such as iOS®, ANDROID®, MS-DOS®, MS-WINDOWS®, OS/2®, UNIX®, LINUX®, or another known operating system. In other cases, the I/O controller 1050 may represent or interact with a modem, a keyboard, a mouse, a touchscreen, or a similar device. In some cases, the I/O controller 1050 may be implemented as part of a processor. In some cases, a user may interact with the device 1005 via the I/O controller 1050 or via hardware components controlled by the I/O controller 1050.

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
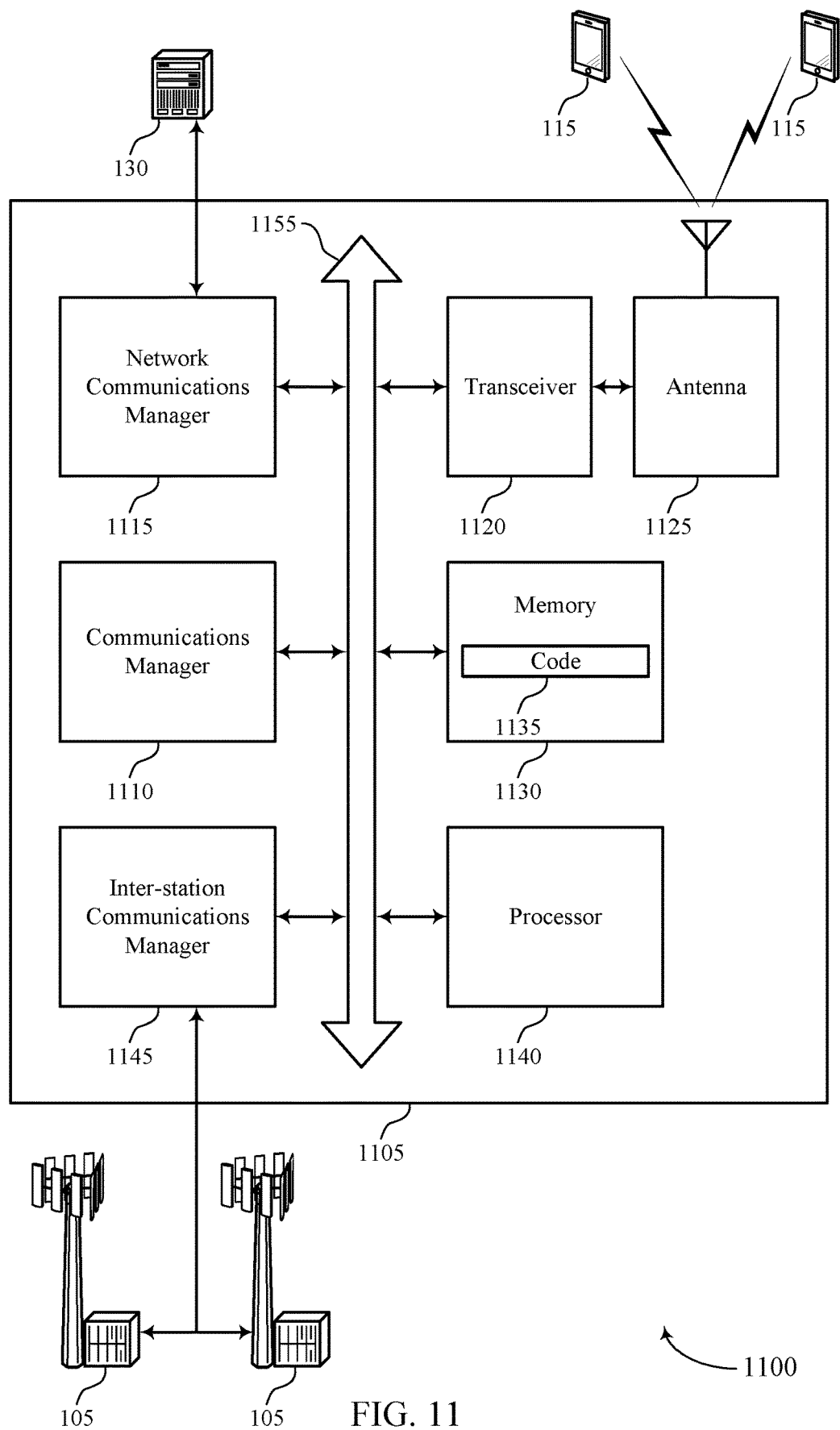
FIG. 11 shows a diagram of a system including a base station that supports resource utilization based event triggering in wireless communications in accordance with aspects of the present disclosure.

FIG. 11 shows a diagram of a system 1100 including a device 1105 that supports resource utilization based event triggering in wireless communications in accordance with aspects of the present disclosure. The device 1105 may be an example of or include the components of device 705, device 805, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1155).

The communications manager 1110 may establish a connection with a core network via a first path that includes at least a first relay node in a wireless communications network, identify at least a second path available for the connection with the core network that includes at least a second relay node, determine a first network load associated with the first path and a second network load associated with the second path, and transmit a report to the core network based on a difference between the first network load and the second network load or a change in one or more of the first network load or the second network load.

The communications manager 1110 may also establish a connection with a core network via a first path that includes at least a first relay node within an IAB network, transmit capability information to the core network that indicates whether the device is a UE node or a MT function of an IAB node, receive, from the core network, configuration information that indicates a first reporting scheme of two or more available reporting schemes for transmitting a report to the core network, and transmit at least a first report via the first relay node according to the first reporting scheme.

Network communications manager 1115 may manage communications with the core network (e.g., via one or more wired backhaul links). For example, the network communications manager 1115 may manage the transfer of data communications for client devices, such as one or more UEs 115.

Transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting resource utilization based event triggering in wireless communications).

Inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
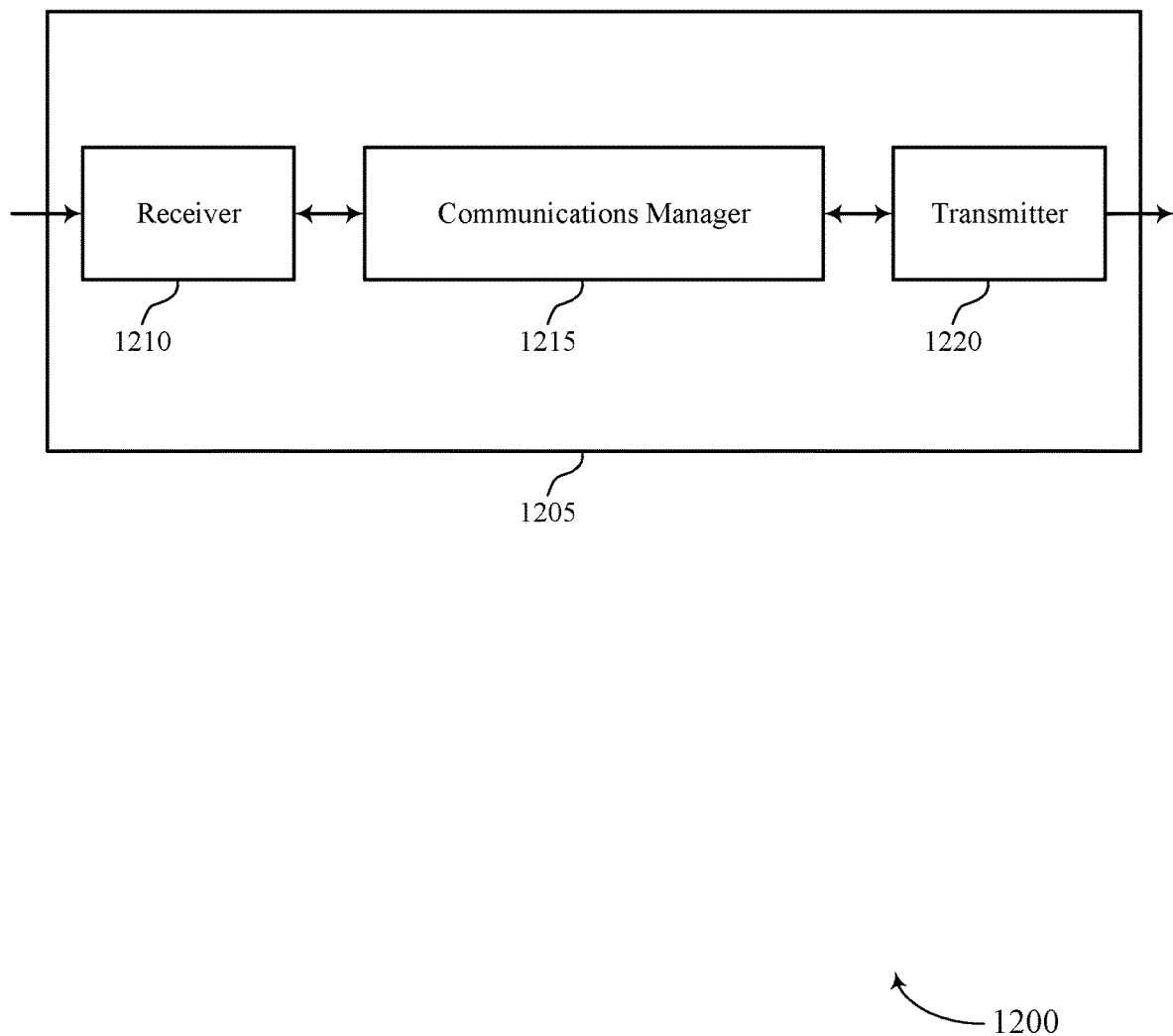
FIGS. 12 and 13 show block diagrams of devices that support resource utilization based event triggering in wireless communications in accordance with aspects of the present disclosure.

FIG. 12 shows a block diagram 1200 of a device 1205 that supports resource utilization based event triggering in wireless communications in accordance with aspects of the present disclosure. The device 1205 may be an example of aspects of a network entity as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to resource utilization based event triggering in wireless communications, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may establish, at a network node that serves two or more child nodes through two or more different paths in a wireless communications network, a connection with a MT function via a first child node and a first path, configure the MT function with a network configuration, where the network configuration includes network load information associated with the first path and at least a second path of the two or more different paths, and receive, at the network node, a report from the MT function that indicates a change in the network load of one or more of the first path, the second path, or a difference in network loads between the first path and the second path.

The communications manager 1215 may also establish a plurality of connections with a plurality of child nodes in the network, receive capability information from the plurality of child nodes, transmit different mobility report configurations to different subsets of the plurality of child nodes based at least in part on the received capability information, where the different mobility report configurations contain different reporting information among one or more of child user equipment (UE) nodes or child mobile termination (MT) functions of one or more integrated access and backhaul (IAB) nodes within the plurality of child nodes, and receive a plurality of reports from the plurality of child nodes based at least in part on the mobility report configurations. The communications manager 1215 may be an example of aspects of the communications manager 1510 described herein. In some examples, different mobility configuration reporting information may be provided for child UE nodes and child MT nodes (e.g., the number of maximum Ncells to report might be different between UEs and MTs). In some cases, one or more of the child nodes may be updated to be configured with an actual number of neighboring cells that are to be reported, that is less than the maximum number.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
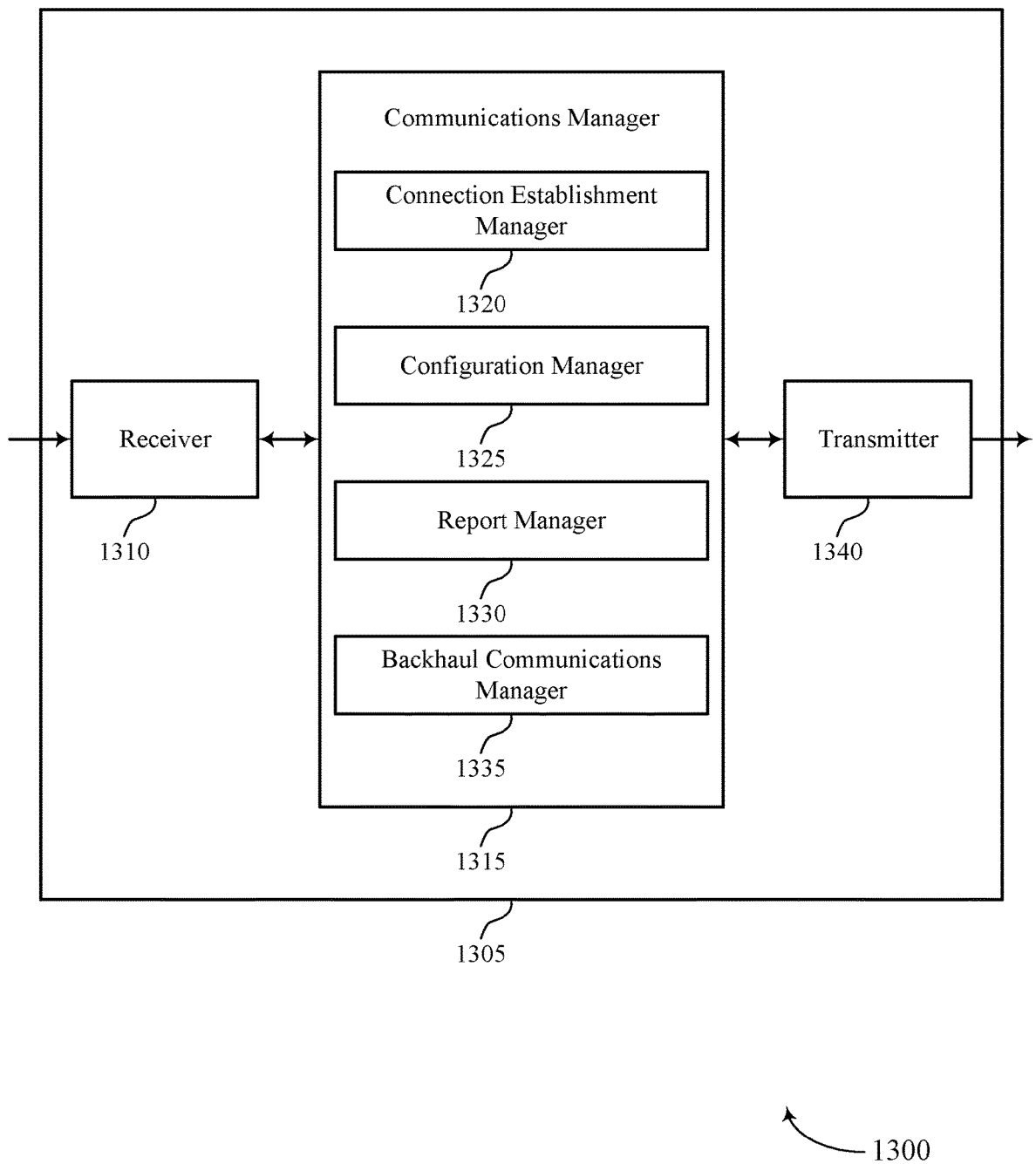

FIG. 13 shows a block diagram 1300 of a device 1305 that supports resource utilization based event triggering in wireless communications in accordance with aspects of the present disclosure. The device 1305 may be an example of aspects of a device 1205 or a network entity as described herein. The device 1305 may include a receiver 1310, a communications manager 1315, and a transmitter 1340. The device 1305 may also include a processor. Each of these components may be in communication with one another (e.g., via one or more buses).

The receiver 1310 may receive information such as packets, user data, or control information associated with various information channels (e.g., control channels, data channels, and information related to resource utilization based event triggering in wireless communications, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a connection establishment manager 1320, a configuration manager 1325, a report manager 1330, and a backhaul communications manager 1335. The communications manager 1315 may be an example of aspects of the communications manager 1510 described herein.

The connection establishment manager 1320 may establish, at a network node that serves two or more child nodes through two or more different paths in a wireless communications network, a connection with a mobile termination (MT) function via a first child node and a first path. In some cases, the connection establishment manager 1320 may establish, at a network node in an IAB network, a set of connections with a set of child nodes in the IAB network.

The configuration manager 1325 may configure the MT function with a network configuration, where the network configuration includes network load information associated with the first path and at least a second path of the two or more different paths. In some cases, the configuration manager 1325 may transmit configuration information to the set of child nodes that indicates two or more reporting schemes for transmitting a report to the network node, where the two or more reporting schemes provide different reporting information for child nodes that provide access links in the IAB network or backhaul links in the IAB network.

The report manager 1330 may receive, at the network node, a report from the MT function that indicates a change in the network load of one or more of the first path, the second path, or a difference in network loads between the first path and the second path.

The backhaul communications manager 1335 may receive a set of reports from the set of child nodes based on the configuration information.

The transmitter 1340 may transmit signals generated by other components of the device 1305. In some examples, the transmitter 1340 may be collocated with a receiver 1310 in a transceiver module. For example, the transmitter 1340 may be an example of aspects of the transceiver 1520 described with reference to FIG. 15. The transmitter 1340 may utilize a single antenna or a set of antennas.

Figure 14:
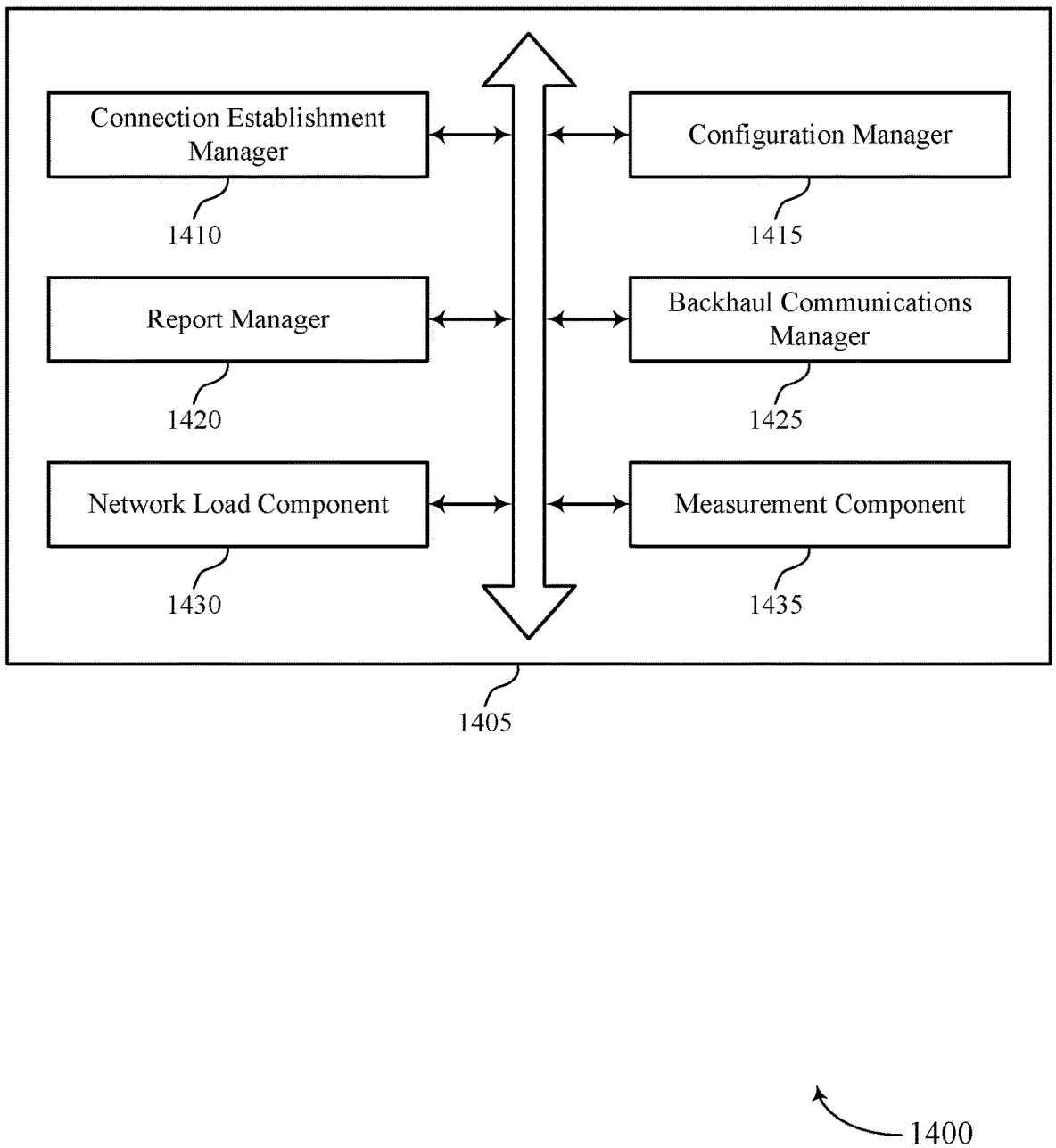
FIG. 14 shows a block diagram of a communications manager that supports resource utilization based event triggering in wireless communications in accordance with aspects of the present disclosure.

FIG. 14 shows a block diagram 1400 of a communications manager 1405 that supports resource utilization based event triggering in wireless communications in accordance with aspects of the present disclosure. The communications manager 1405 may be an example of aspects of a communications manager 1215, a communications manager 1315, or a communications manager 1510 described herein. The communications manager 1405 may include a connection establishment manager 1410, a configuration manager 1415, a report manager 1420, a backhaul communications manager 1425, a network load component 1430, and a measurement component 1435. Each of these modules may communicate, directly or indirectly, with one another (e.g., via one or more buses).

The connection establishment manager 1410 may establish, at a network node that serves two or more child nodes through two or more different paths in a wireless communications network, a connection with a MT function via a first child node and a first path. In some examples, the connection establishment manager 1410 may establish, at a network node in an IAB network, a set of connections with a set of child nodes in the IAB network. In some cases, the one or more child nodes are IAB nodes, and where one or more IAB nodes may be incorporated in one of more base stations in the wireless communications network.

The configuration manager 1415 may configure the MT function with a network configuration, where the network configuration includes network load information associated with the first path and at least a second path of the two or more different paths. In some examples, the configuration manager 1415 may receive capability information from the plurality of child nodes, transmit different mobility report configurations to different subsets of the plurality of child nodes based at least in part on the received capability information, where the different mobility report configurations contain different reporting information among one or more of child UE nodes or child MT functions of one or more IAB nodes within the plurality of child nodes. In some cases, the configuration information indicates a first maximum number of neighboring nodes that are to be reported for child nodes that provide an access link, and a second maximum number of neighboring nodes that are to be reported for child nodes that provide a backhaul link.

In some cases, the configuration information indicates a MAC-CE message that is to be used by each child node for transmitting an associated report, and where different MAC-CE messages support reports for different numbers of measured neighboring nodes. In some cases, the different MAC-CE messages include MAC-CE messages with different lengths.

The report manager 1420 may receive a report from the MT function that indicates a change in the network load of one or more of the first path, the second path, or a difference in network loads between the first path and the second path. In some cases, the report manager 1420 may receive a set of reports from the set of child nodes based on the configuration information.

In some examples, the backhaul communications manager 1425 may transmit, responsive to the report from the MT function, an indication to the MT function to switch the connection with the network node from the first path to the second path. In some cases, the first child node connects with the network node via an anchor node in the wireless communications network.

The network load component 1430 may receive, from the MT function, an adjusted network load report that indicates a change in network load of one or more of the child nodes, or a difference between two or more network loads. In some cases, the network configuration indicates that the report from the MT function is to be triggered based on one or more of a congestion of one or more nodes within the first path or the second path, a congestion of one or more links within the first path or the second path, a resource utilization of one or more nodes within the first path or the second path, a resource utilization of one or more links within the first path or the second path, a number of other nodes connected with an anchor node via one or more nodes within the first path or the second path, or any combinations thereof. In some cases, the network configuration further includes network load information of a most congested node in each of at least the first path and the second path.

The measurement component 1435 may receive, from the MT function, a measurement report including one or more channel conditions measured at the MT function, the measurement report transmitted responsive to switching of the connection from the first path to the second path. In some cases, the one or more channel conditions include a RSRP, a RSRQ, a SINR, or any combinations thereof.

Figure 15:
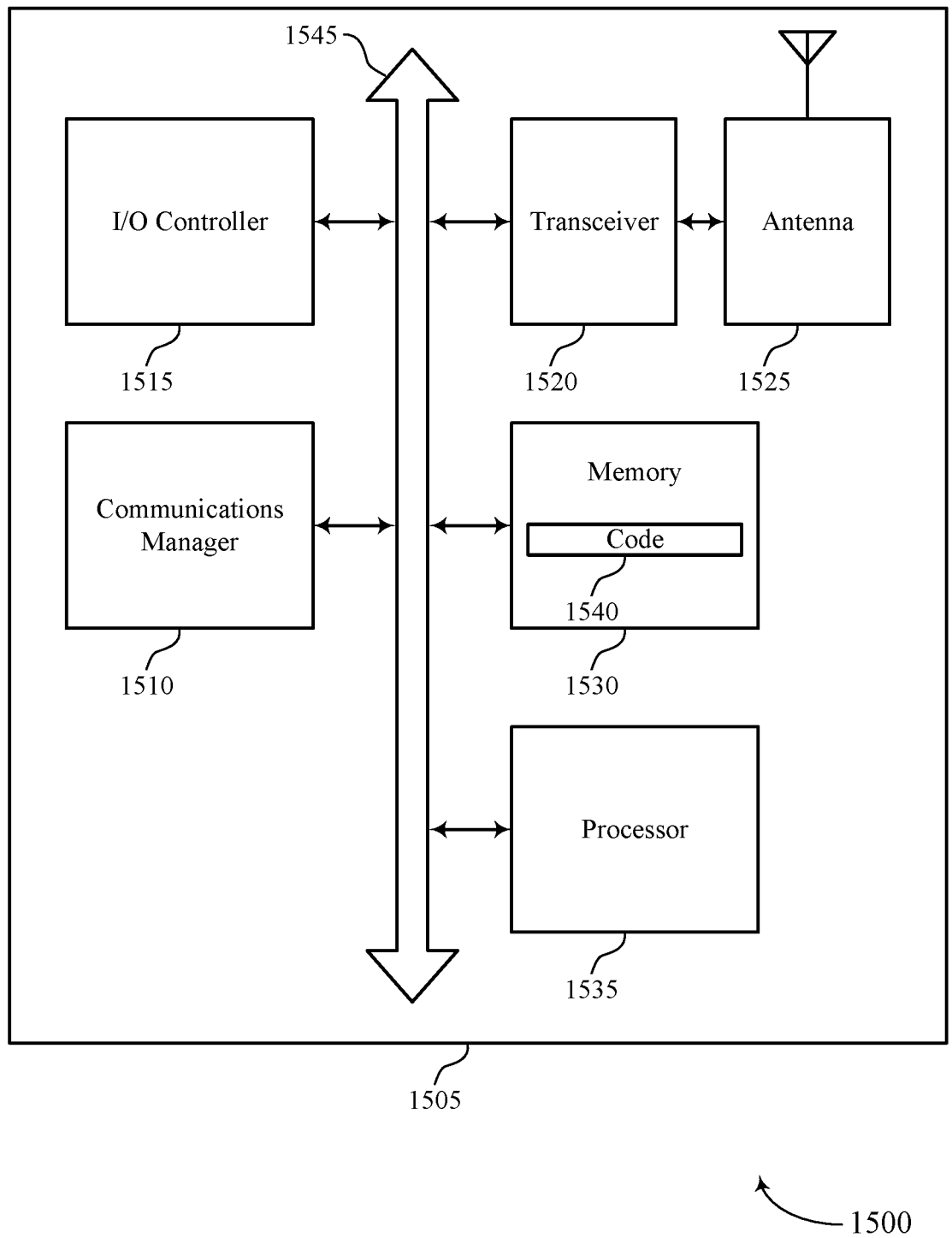
FIG. 15 shows a diagram of a system including a device that supports resource utilization based event triggering in wireless communications in accordance with aspects of the present disclosure.

FIG. 15 shows a diagram of a system 1500 including a device 1505 that supports resource utilization based event triggering in wireless communications in accordance with aspects of the present disclosure. The device 1505 may be an example of or include the components of device 1205, device 1305, or a network entity as described herein. The device 1505 may include components for bi-directional voice and data communications including components for transmitting and receiving communications, including a communications manager 1510, an I/O controller 1515, a transceiver 1520, an antenna 1525, memory 1530, and a processor 1535. These components may be in electronic communication via one or more buses (e.g., bus 1545).

The communications manager 1510 may establish, at a network node that serves two or more child nodes through two or more different paths in a wireless communications network, a connection with a MT function via a first child node and a first path, configure the MT function with a network configuration, where the network configuration includes network load information associated with the first path and at least a second path of the two or more different paths, and receive, at the network node, a report from the MT function that indicates a change in the network load of one or more of the first path, the second path, or a difference in network loads between the first path and the second path.

The communications manager 1510 may also establish a set of connections with a set of child nodes in the network, receive capability information from the plurality of child nodes, transmit different mobility report configurations to different subsets of the set of child nodes based at least in part on the received capability information, where the different mobility report configurations contain different reporting information among one or more of child UE nodes or child MT functions of one or more IAB nodes within the set of child nodes, and receive a set of reports from the set of child nodes based at least in part on the mobility report configurations.

The I/O controller 1515 may manage input and output signals for the device 1505. The I/O controller 1515 may also manage peripherals not integrated into the device 1505. In some cases, the I/O controller 1515 may represent a physical connection or port to an external peripheral. In some cases, the I/O controller 1515 may utilize an operating system such as iOS®, ANDROID®, MS-DOS®, MS-WINDOWS®, OS/2®, UNIX®, LINUX®, or another known operating system. In other cases, the I/O controller 1515 may represent or interact with a modem, a keyboard, a mouse, a touchscreen, or a similar device. In some cases, the I/O controller 1515 may be implemented as part of a processor. In some cases, a user may interact with the device 1505 via the I/O controller 1515 or via hardware components controlled by the I/O controller 1515.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM and ROM. The memory 1530 may store computer-readable, computer-executable code 1540 including instructions that, when executed, cause the processor to perform various functions described herein. In some cases, the memory 1530 may contain, among other things, a BIOS which may control basic hardware or software operation such as the interaction with peripheral components or devices.

The processor 1535 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1535 may be configured to operate a memory array using a memory controller. In other cases, a memory controller may be integrated into the processor 1535. The processor 1535 may be configured to execute computer-readable instructions stored in a memory (e.g., the memory 1530) to cause the device 1505 to perform various functions (e.g., functions or tasks supporting resource utilization based event triggering in wireless communications).

The code 1540 may include instructions to implement aspects of the present disclosure, including instructions to support wireless communications. The code 1540 may be stored in a non-transitory computer-readable medium such as system memory or other type of memory. In some cases, the code 1540 may not be directly executable by the processor 1535 but may cause a computer (e.g., when compiled and executed) to perform functions described herein.

Figure 16:
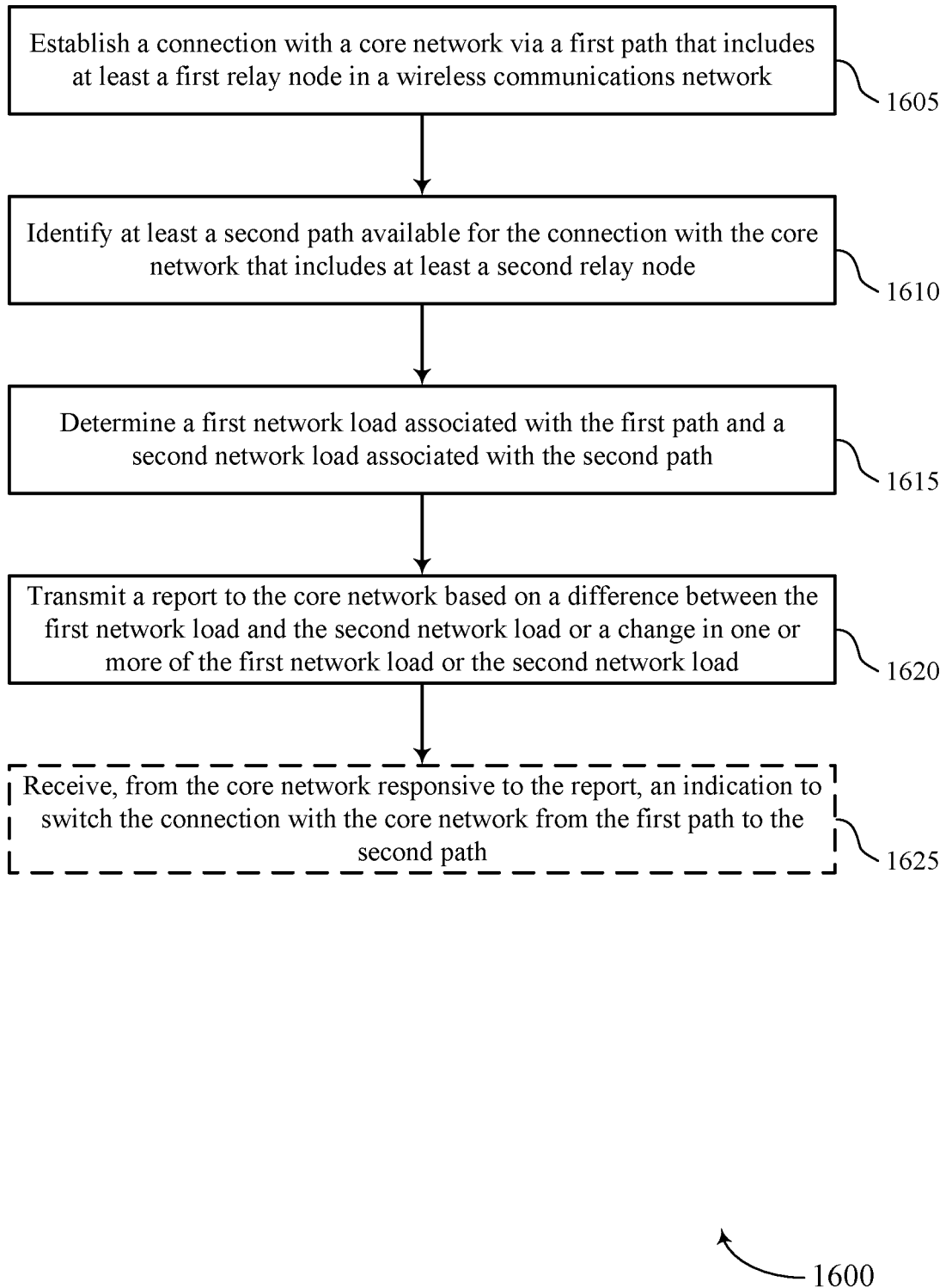
FIGS. 16-22 show flowcharts illustrating methods that support resource utilization based event triggering in wireless communications in accordance with aspects of the present disclosure.

FIG. 16 shows a flowchart illustrating a method 1600 that supports resource utilization based event triggering in wireless communications in accordance with aspects of the present disclosure. The operations of method 1600 may be implemented by a UE 115 or base station 105 or its components as described herein. For example, the operations of method 1600 may be performed by a communications manager as described with reference to FIGS. 7 through 11. In some examples, a UE or base station may execute a set of instructions to control the functional elements of the UE or base station to perform the functions described below. Additionally or alternatively, a UE or base station may perform aspects of the functions described below using special-purpose hardware.

At 1605, the UE or base station may establish a connection with a core network via a first path that includes at least a first relay node in a wireless communications network. The operations of 1605 may be performed according to the methods described herein. In some examples, aspects of the operations of 1605 may be performed by a connection establishment manager as described with reference to FIGS. 7 through 11.

At 1610, the UE or base station may identify at least a second path available for the connection with the core network that includes at least a second relay node. The operations of 1610 may be performed according to the methods described herein. In some examples, aspects of the operations of 1610 may be performed by a backhaul communications manager as described with reference to FIGS. 7 through 11.

At 1615, the UE or base station may determine a first network load associated with the first path and a second network load associated with the second path. The operations of 1615 may be performed according to the methods described herein. In some examples, aspects of the operations of 1615 may be performed by a network load component as described with reference to FIGS. 7 through 11.

At 1620, the UE or base station may transmit a report to the core network based on a difference between the first network load and the second network load or a change in one or more of the first network load or the second network load. The operations of 1620 may be performed according to the methods described herein. In some examples, aspects of the operations of 1620 may be performed by a report manager as described with reference to FIGS. 7 through 11.

Optionally, at 1625, the UE or base station may receive, from the core network responsive to the report, an indication to switch the connection with the core network from the first path to the second path. The operations of 1625 may be performed according to the methods described herein. In some examples, aspects of the operations of 1625 may be performed by a backhaul communications manager as described with reference to FIGS. 7 through 11. In some cases, the first network load and the second network load are determined based on one or more of a congestion of one or more nodes within the first path or the second path, a congestion of one or more links within the first path or the second path, a resource utilization of one or more nodes within the first path or the second path, a resource utilization of one or more links within the first path or the second path, a number of other nodes connected with an anchor node via one or more nodes within the first path or the second path, or any combinations thereof.

Figure 17:
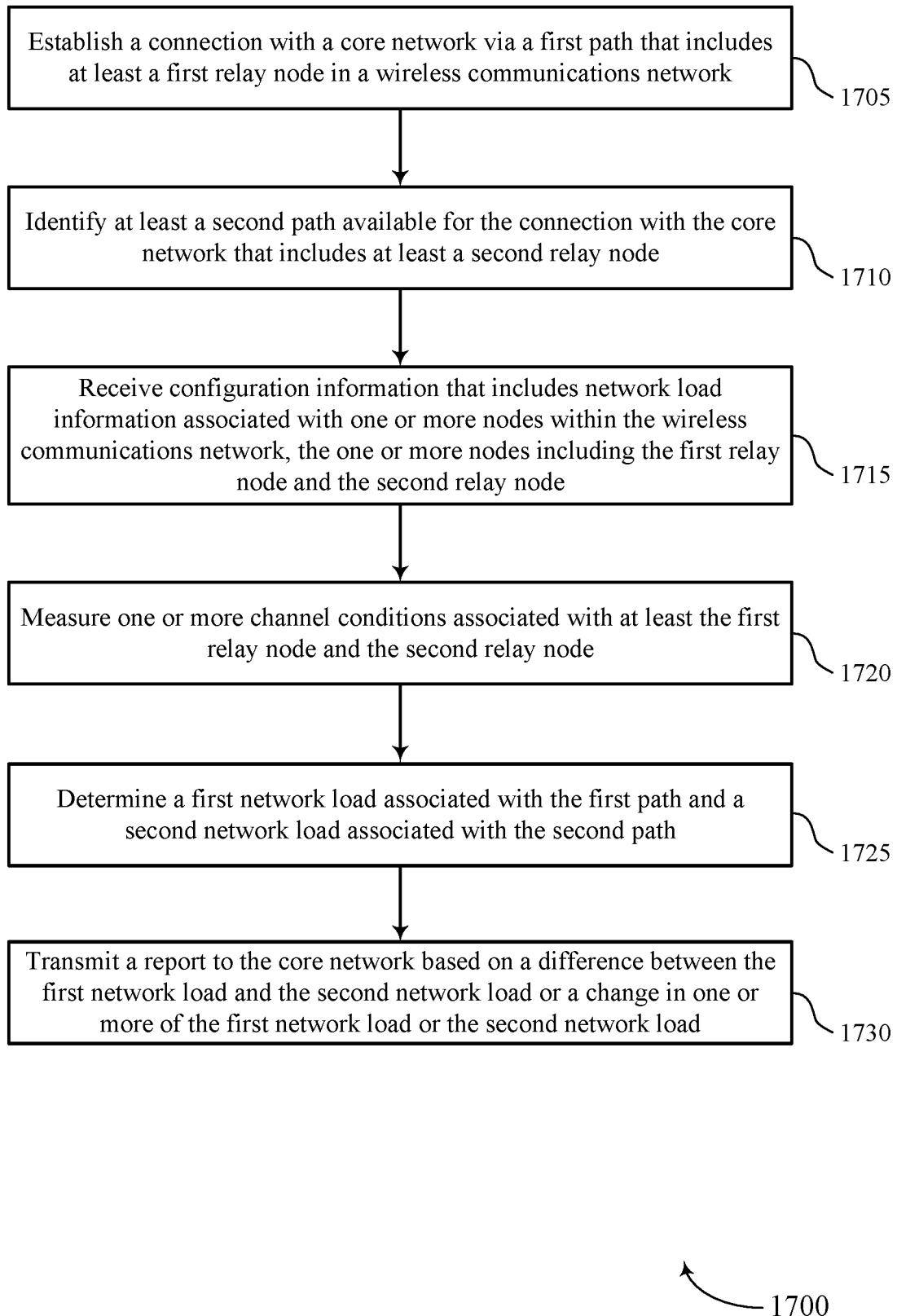

FIG. 17 shows a flowchart illustrating a method 1700 that supports resource utilization based event triggering in wireless communications in accordance with aspects of the present disclosure. The operations of method 1700 may be implemented by a UE 115 or base station 105 or its components as described herein. For example, the operations of method 1700 may be performed by a communications manager as described with reference to FIGS. 7 through 11. In some examples, a UE or base station may execute a set of instructions to control the functional elements of the UE or base station to perform the functions described below. Additionally or alternatively, a UE or base station may perform aspects of the functions described below using special-purpose hardware.

At 1705, the UE or base station may establish a connection with a core network via a first path that includes at least a first relay node in a wireless communications network. The operations of 1705 may be performed according to the methods described herein. In some examples, aspects of the operations of 1705 may be performed by a connection establishment manager as described with reference to FIGS. 7 through 11.

At 1710, the UE or base station may identify at least a second path available for the connection with the core network that includes at least a second relay node. The operations of 1710 may be performed according to the methods described herein. In some examples, aspects of the operations of 1710 may be performed by a backhaul communications manager as described with reference to FIGS. 7 through 11.

At 1715, the UE or base station may receive configuration information that includes network load information associated with one or more nodes within the wireless communications network, the one or more nodes including the first relay node and the second relay node. The operations of 1715 may be performed according to the methods described herein. In some examples, aspects of the operations of 1715 may be performed by a configuration manager as described with reference to FIGS. 7 through 11.

At 1720, the UE or base station may measure one or more channel conditions associated with at least the first relay node and the second relay node. The operations of 1720 may be performed according to the methods described herein. In some examples, aspects of the operations of 1720 may be performed by a measurement component as described with reference to FIGS. 7 through 11. In some cases, the one or more channel conditions include a RSRP, a RSRQ, a SINR, or any combinations thereof.

At 1725, the UE or base station may determine a first network load associated with the first path and a second network load associated with the second path. The operations of 1725 may be performed according to the methods described herein. In some examples, aspects of the operations of 1725 may be performed by a network load component as described with reference to FIGS. 7 through 11.

At 1730, the UE or base station may transmit a report to the core network based on a difference between the first network load and the second network load or a change in one or more of the first network load or the second network load. The operations of 1730 may be performed according to the methods described herein. In some examples, aspects of the operations of 1730 may be performed by a report manager as described with reference to FIGS. 7 through 11. In some cases, the first network load and the second network load are determined based on one or more of a congestion of one or more nodes within the first path or the second path, a congestion of one or more links within the first path or the second path, a resource utilization of one or more nodes within the first path or the second path, a resource utilization of one or more links within the first path or the second path, a number of other nodes connected with an anchor node via one or more nodes within the first path or the second path, or any combinations thereof. In some cases, the report includes a measurement report including the one or more channel conditions to initiate a switch of the connection with the core network from the first path to the second path.

Figure 18:
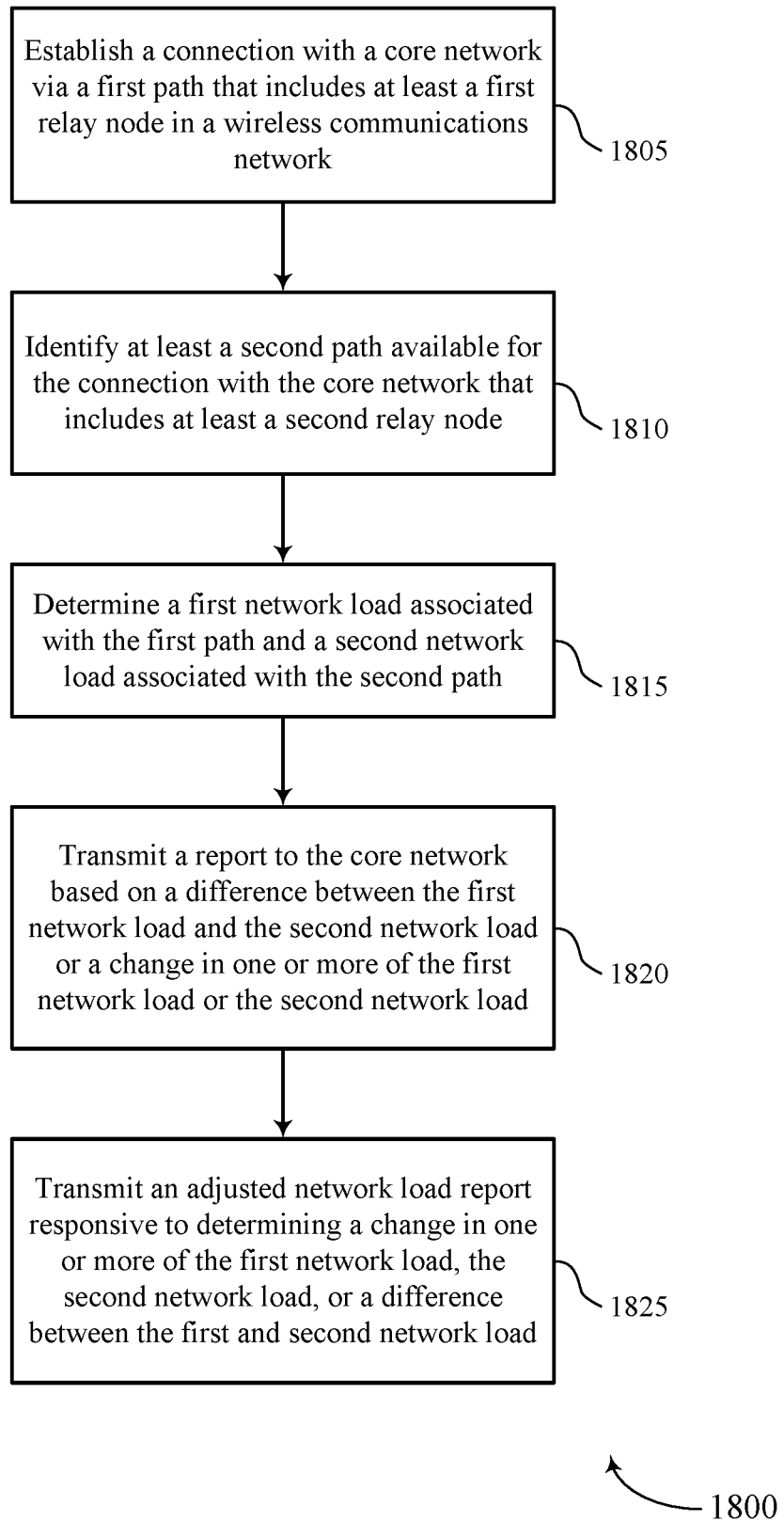

FIG. 18 shows a flowchart illustrating a method 1800 that supports resource utilization based event triggering in wireless communications in accordance with aspects of the present disclosure. The operations of method 1800 may be implemented by a UE 115 or base station 105 or its components as described herein. For example, the operations of method 1800 may be performed by a communications manager as described with reference to FIGS. 7 through 11. In some examples, a UE or base station may execute a set of instructions to control the functional elements of the UE or base station to perform the functions described below. Additionally or alternatively, a UE or base station may perform aspects of the functions described below using special-purpose hardware.

At 1805, the UE or base station may establish a connection with a core network via a first path that includes at least a first relay node in a wireless communications network. The operations of 1805 may be performed according to the methods described herein. In some examples, aspects of the operations of 1805 may be performed by a connection establishment manager as described with reference to FIGS. 7 through 11.

At 1810, the UE or base station may identify at least a second path available for the connection with the core network that includes at least a second relay node. The operations of 1810 may be performed according to the methods described herein. In some examples, aspects of the operations of 1810 may be performed by a backhaul communications manager as described with reference to FIGS. 7 through 11.

At 1815, the UE or base station may determine a first network load associated with the first path and a second network load associated with the second path. The operations of 1815 may be performed according to the methods described herein. In some examples, aspects of the operations of 1815 may be performed by a network load component as described with reference to FIGS. 7 through 11.

At 1820, the UE or base station may transmit a report to the core network based on a difference between the first network load and the second network load or a change in one or more of the first network load or the second network load. The operations of 1820 may be performed according to the methods described herein. In some examples, aspects of the operations of 1820 may be performed by a report manager as described with reference to FIGS. 7 through 11.

At 1825, the UE or base station may transmit an adjusted network load report responsive to determining a change in one or more of the first network load, the second network load, or a difference between the first and second network load. The operations of 1825 may be performed according to the methods described herein. In some examples, aspects of the operations of 1825 may be performed by a backhaul communications manager as described with reference to FIGS. 7 through 11.

Figure 19:
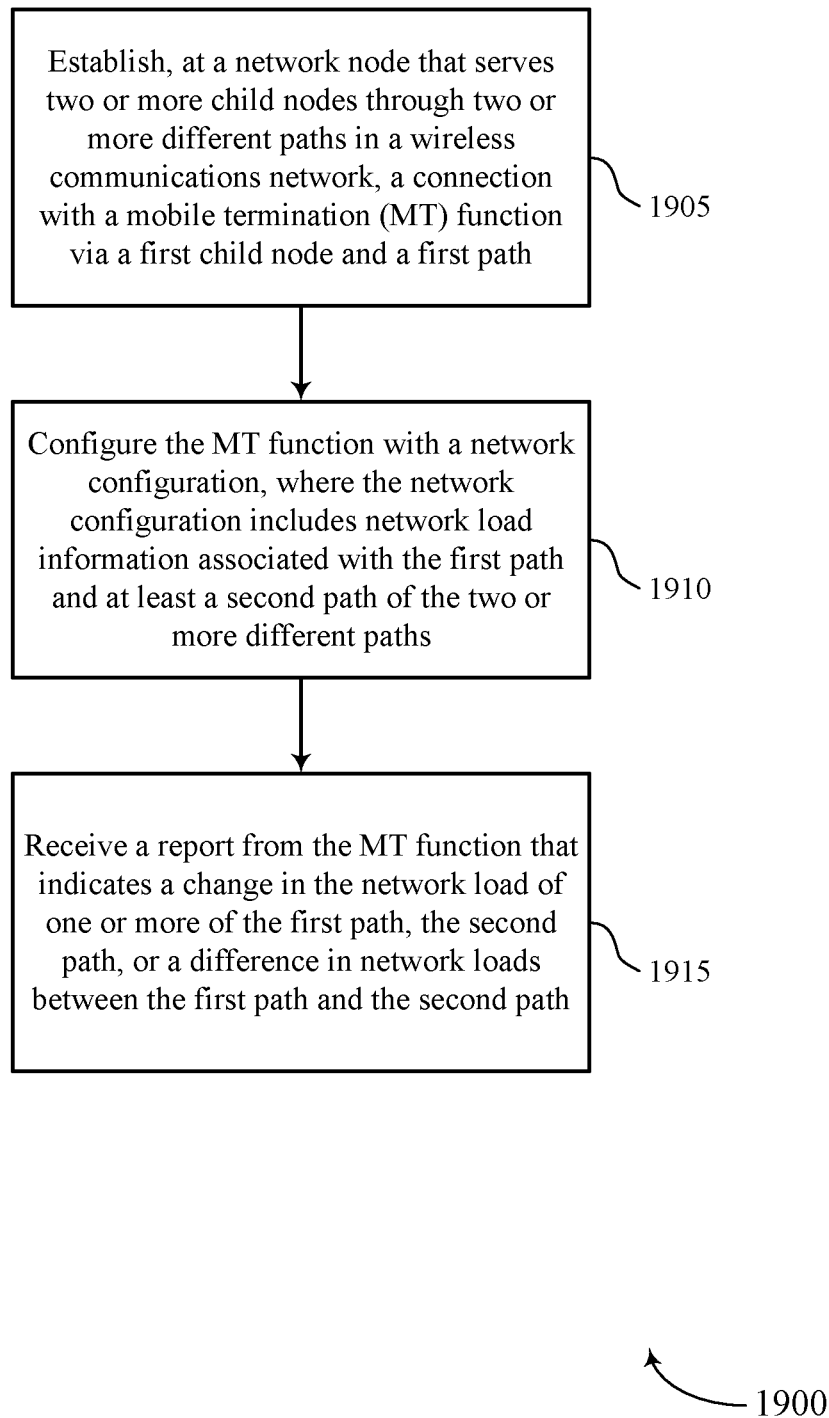

FIG. 19 shows a flowchart illustrating a method 1900 that supports resource utilization based event triggering in wireless communications in accordance with aspects of the present disclosure. The operations of method 1900 may be implemented by a network entity or its components as described herein. For example, the operations of method 1900 may be performed by a communications manager as described with reference to FIGS. 12 through 15. In some examples, a network entity may execute a set of instructions to control the functional elements of the network entity to perform the functions described below. Additionally or alternatively, a network entity may perform aspects of the functions described below using special-purpose hardware.

At 1905, the network entity may establish, at a network node that serves two or more child nodes through two or more different paths in a wireless communications network, a connection with a mobile termination (MT) function via a first child node and a first path. The operations of 1905 may be performed according to the methods described herein. In some examples, aspects of the operations of 1905 may be performed by a connection establishment manager as described with reference to FIGS. 12 through 15.

At 1910, the network entity may configure the MT function with a network configuration, where the network configuration includes network load information associated with the first path and at least a second path of the two or more different paths. The operations of 1910 may be performed according to the methods described herein. In some examples, aspects of the operations of 1910 may be performed by a configuration manager as described with reference to FIGS. 12 through 15.

At 1915, the network entity may receive, at the network node, a report from the MT function that indicates a change in the network load of one or more of the first path, the second path, or a difference in network loads between the first path and the second path. The operations of 1915 may be performed according to the methods described herein. In some examples, aspects of the operations of 1915 may be performed by a report manager as described with reference to FIGS. 12 through 15.

Figure 20:
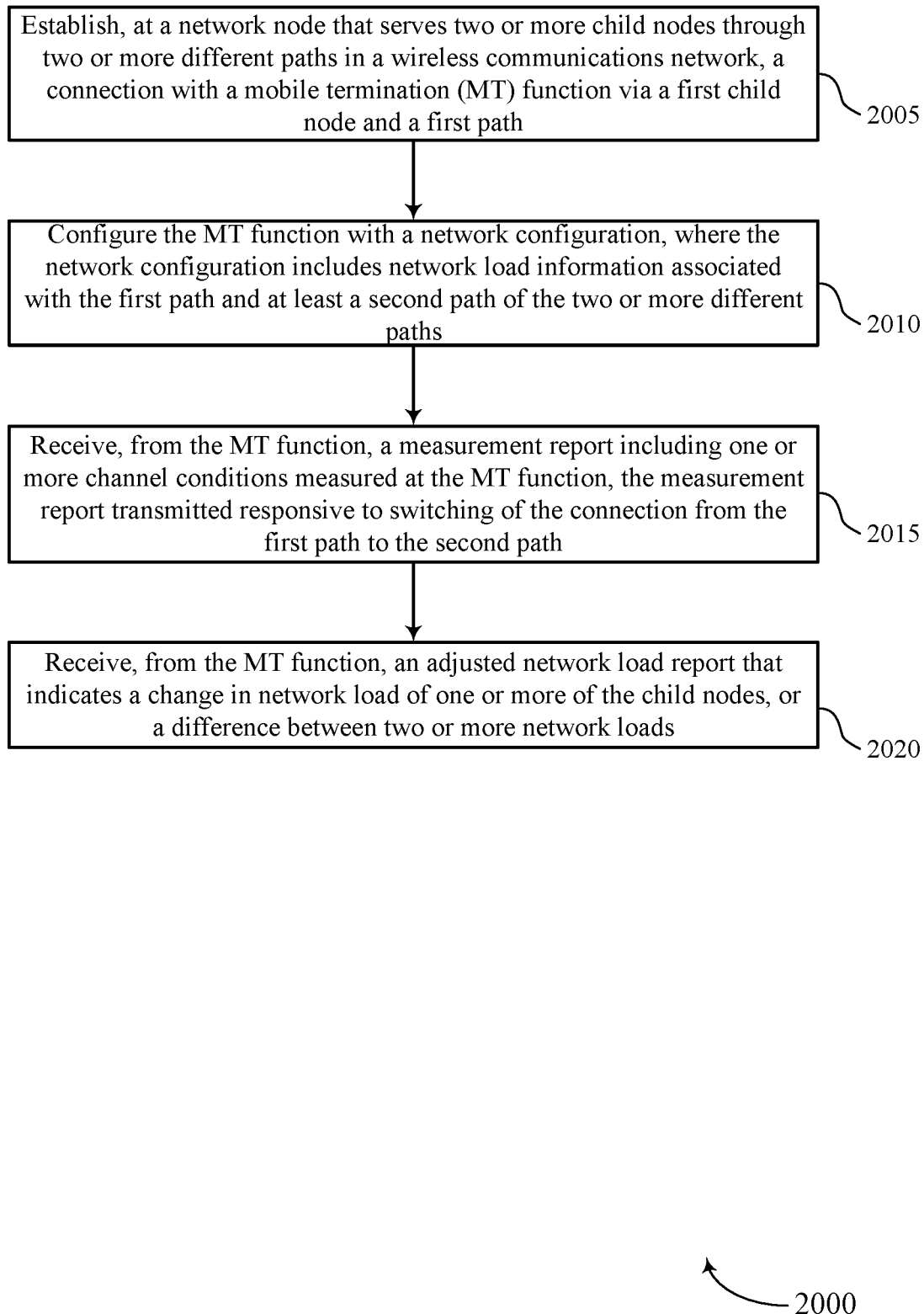

FIG. 20 shows a flowchart illustrating a method 2000 that supports resource utilization based event triggering in wireless communications in accordance with aspects of the present disclosure. The operations of method 2000 may be implemented by a network entity or its components as described herein. For example, the operations of method 2000 may be performed by a communications manager as described with reference to FIGS. 12 through 15. In some examples, a network entity may execute a set of instructions to control the functional elements of the network entity to perform the functions described below. Additionally or alternatively, a network entity may perform aspects of the functions described below using special-purpose hardware.

At 2005, the network entity may establish, at a network node that serves two or more child nodes through two or more different paths in a wireless communications network, a connection with a mobile termination (MT) function via a first child node and a first path. The operations of 2005 may be performed according to the methods described herein. In some examples, aspects of the operations of 2005 may be performed by a connection establishment manager as described with reference to FIGS. 12 through 15.

At 2010, the network entity may configure the MT function with a network configuration, where the network configuration includes network load information associated with the first path and at least a second path of the two or more different paths. The operations of 2010 may be performed according to the methods described herein. In some examples, aspects of the operations of 2010 may be performed by a configuration manager as described with reference to FIGS. 12 through 15.

At 2015, the network entity may receive, from the MT function, a measurement report including one or more channel conditions measured at the MT function, the measurement report transmitted responsive to switching of the connection from the first path to the second path. The operations of 2015 may be performed according to the methods described herein. In some examples, aspects of the operations of 2015 may be performed by a measurement component as described with reference to FIGS. 12 through 15.

At 2020, the network entity may receive, from the MT function, an adjusted network load report that indicates a change in network load of one or more of the child nodes, or a difference between two or more network loads. The operations of 2020 may be performed according to the methods described herein. In some examples, aspects of the operations of 2020 may be performed by a report manager as described with reference to FIGS. 12 through 15. In some cases, the one or more channel conditions include a RSRP, a RSRQ, a SINR, or any combinations thereof.

Figure 21:
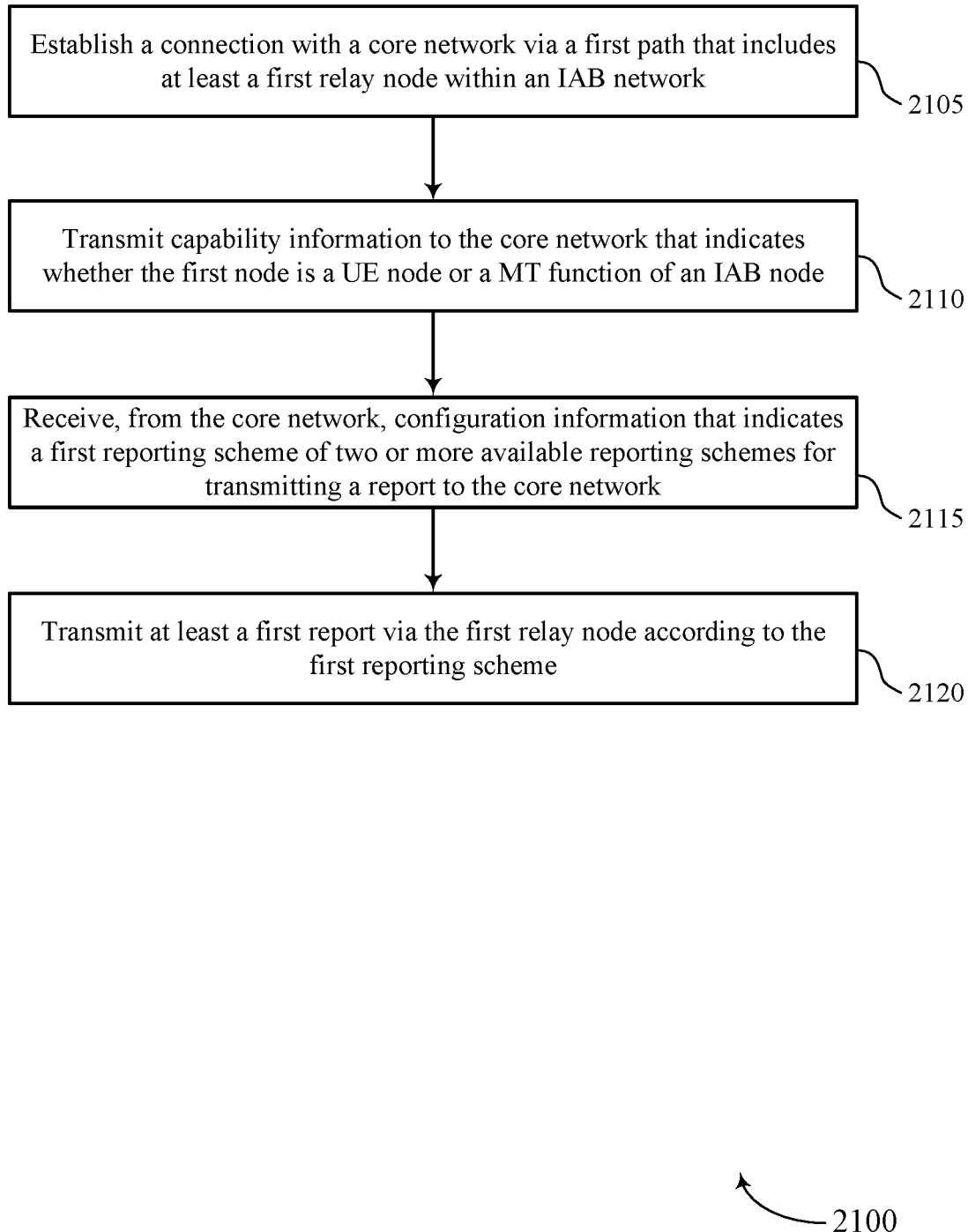

FIG. 21 shows a flowchart illustrating a method 2100 that supports resource utilization based event triggering in wireless communications in accordance with aspects of the present disclosure. The operations of method 2100 may be implemented by a UE 115 or base station 105 or its components as described herein. For example, the operations of method 2100 may be performed by a communications manager as described with reference to FIGS. 7 through 11. In some examples, a UE or base station may execute a set of instructions to control the functional elements of the UE or base station to perform the functions described below. Additionally or alternatively, a UE or base station may perform aspects of the functions described below using special-purpose hardware.

At 2105, the UE or base station may establish a connection with a core network via a first path that includes at least a first relay node within an IAB network. The operations of 2105 may be performed according to the methods described herein. In some examples, aspects of the operations of 2105 may be performed by a connection establishment manager as described with reference to FIGS. 7 through 11.

At 2110, the UE or base station may transmit capability information to the core network that indicates whether the first node is a UE node or a MT function of an IAB node. The operations of 2110 may be performed according to the methods described herein. In some examples, aspects of the operations of 2110 may be performed by a configuration manager as described with reference to FIGS. 7 through 11.

At 2115, the UE or base station may receive, from the core network, configuration information that indicates a first reporting scheme of two or more available reporting schemes for transmitting a report to the core network. The operations of 2115 may be performed according to the methods described herein. In some examples, aspects of the operations of 2115 may be performed by a configuration manager as described with reference to FIGS. 7 through 11. In some cases, the configuration information indicates a first maximum number of neighboring nodes that are to be reported when the first node provides an access link, and a second maximum number of neighboring nodes that are to be reported when the first node provides a backhaul link. In some cases, the configuration information indicates a MAC-CE message that is to be used for transmitting the first report, and where different MAC-CE messages support reports for different numbers of measured neighboring nodes. In some cases, the different MAC-CE messages include MAC-CE messages with different lengths.

At 2120, the UE or base station may transmit at least a first report via the first relay node according to the first reporting scheme. The operations of 2120 may be performed according to the methods described herein. In some examples, aspects of the operations of 2120 may be performed by a backhaul communications manager as described with reference to FIGS. 7 through 11.

Figure 22:
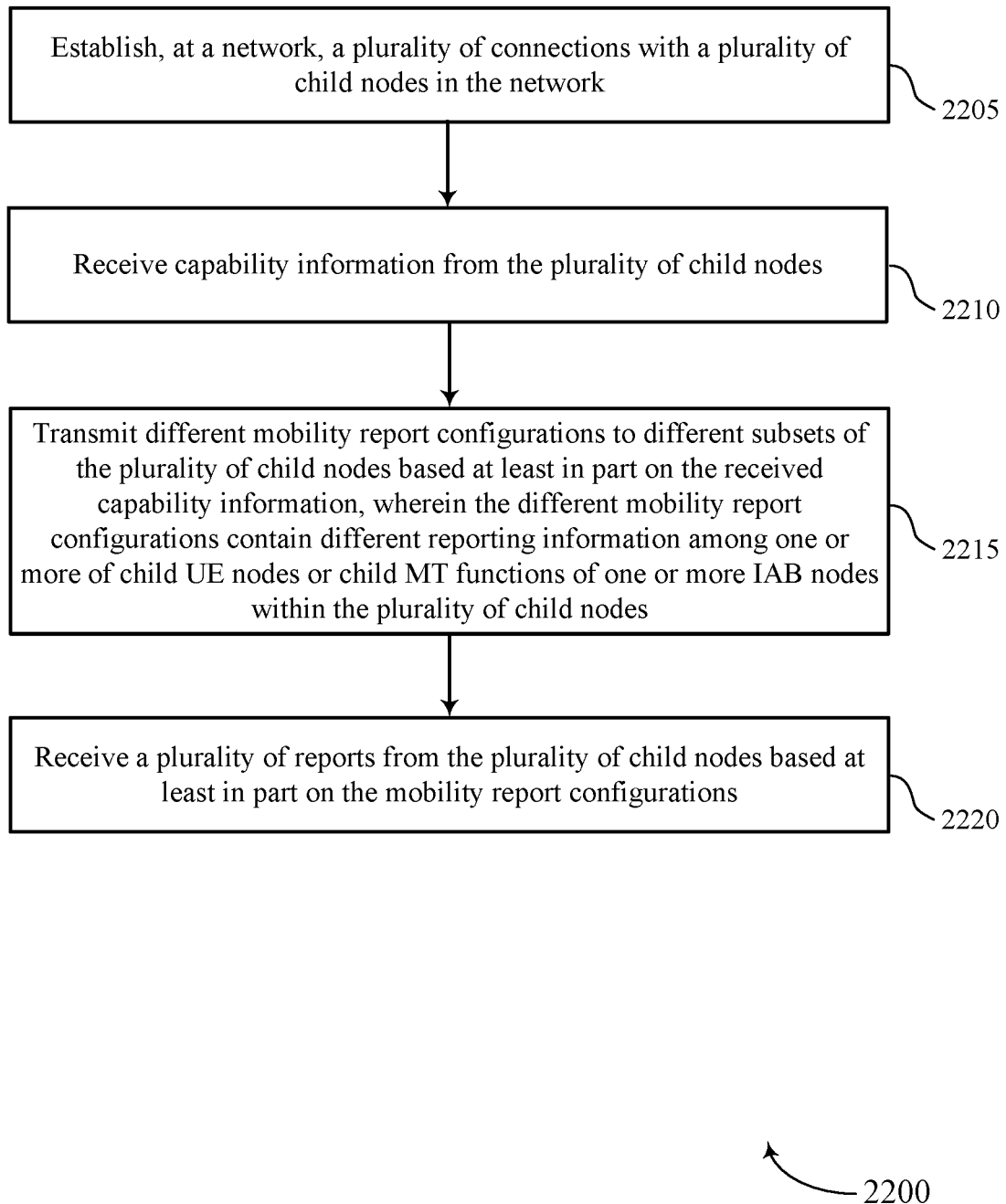

FIG. 22 shows a flowchart illustrating a method 2200 that supports resource utilization based event triggering in wireless communications in accordance with aspects of the present disclosure. The operations of method 2200 may be implemented by a network entity or its components as described herein. For example, the operations of method 2200 may be performed by a communications manager as described with reference to FIGS. 12 through 15. In some examples, a network entity may execute a set of instructions to control the functional elements of the network entity to perform the functions described below. Additionally or alternatively, a network entity may perform aspects of the functions described below using special-purpose hardware.

At 2205, the network entity may establish a plurality of connections with a plurality of child nodes in the network. The operations of 2205 may be performed according to the methods described herein. In some examples, aspects of the operations of 2205 may be performed by a connection establishment manager as described with reference to FIGS. 12 through 15.

At 2210, the network entity may receive capability information from the plurality of child nodes. The operations of 2210 may be performed according to the methods described herein. In some examples, aspects of the operations of 2210 may be performed by a connection establishment manager as described with reference to FIGS. 12 through 15.

At 2215, the network entity may transmit different mobility report configurations to different subsets of the plurality of child nodes based at least in part on the received capability information, where the different mobility report configurations contain different reporting information among one or more of child UE nodes or child MT functions of one or more IAB nodes within the plurality of child nodes. The operations of 2215 may be performed according to the methods described herein. In some examples, aspects of the operations of 2215 may be performed by a configuration manager as described with reference to FIGS. 12 through 15. In some cases, the configuration information indicates a first maximum number of neighboring nodes that are to be reported for child nodes that provide an access link, and a second maximum number of neighboring nodes that are to be reported for child nodes that provide a backhaul link. In some cases, the configuration information indicates a MAC-CE message that is to be used by each child node for transmitting an associated report, and where different MAC-CE messages support reports for different numbers of measured neighboring nodes. In some cases, the different MAC-CE messages include MAC-CE messages with different lengths.

At 2220, the network entity may receive a plurality of reports from the plurality of child nodes based at least in part on the mobility report configurations. The operations of 2220 may be performed according to the methods described herein. In some examples, aspects of the operations of 2220 may be performed by a backhaul communications manager as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    establishing, at a first node, a connection with a network via a first path that includes at least a first relay node in a wireless communications network, wherein the first node is a user equipment (UE) or a mobile termination (MT) function within the wireless communications network;
    identifying, at the first node, at least a second path available for the connection with the network that includes at least a second relay node;
    determining, by the first node, a first network load associated with the first path that includes one or more units of data traffic that the first node is to transmit to the network, and a second network load associated with the second path that includes the one or more units of data traffic; and
    transmitting a report to the network based at least in part on a difference between the first network load and the second network load determined by the first node or a change in one or more of the first network load or the second network load determined by the first node.

2. The method of claim 1, wherein the first node connects with the network via an anchor node in the wireless communications network.

3. The method of claim 1, further comprising:
    receiving, from the network responsive to the report, an indication to switch the connection with the network from the first path to the second path.

4. The method of claim 1, wherein the first node, the first relay node, and the second relay node are integrated access and backhaul (IAB) nodes, and wherein one or more IAB nodes may be incorporated in one or more base stations in the wireless communications network.

5. The method of claim 1, wherein the first relay node and the second relay node are mobile termination (MT) functions in integrated access and backhaul (IAB) nodes.

6. The method of claim 1, wherein the first network load and the second network load are determined based at least in part on one or more of:
    a congestion of one or more nodes within the first path or the second path,
    a congestion of one or more links within the first path or the second path,
    a resource utilization of one or more nodes within the first path or the second path,
    a resource utilization of one or more links within the first path or the second path,
    a number of other nodes connected with an anchor node via one or more nodes within the first path or the second path,
    or any combinations thereof.

7. The method of claim 6, further comprising:
    receiving, at the first node, configuration information that includes network load information associated with one or more nodes within the wireless communications network, the one or more nodes including the first relay node and the second relay node.

8. The method of claim 7, further comprising:
    measuring one or more channel conditions associated with at least the first relay node and the second relay node; and
    determining, at the first node, to switch the connection with the network to the second path based at least in part on the measured one or more channel conditions and the network load information that includes the one or more units of data traffic.

9. The method of claim 8, wherein the one or more channel conditions comprise a reference signal received power (RSRP), a reference signal received quality (RSRQ), a signal to interference and noise ratio (SINR), or any combinations thereof.

10. The method of claim 8, wherein the report comprises a measurement report including the one or more channel conditions to initiate the switch of the connection with the network from the first path to the second path.

11. The method of claim 1, further comprising:
    transmitting an adjusted network load report responsive to determining the change in one or more of the first network load, the second network load, or the difference between the first network load and the second network load.

12. The method of claim 1, wherein the determining is based at least in part on configuration information that includes network load information of a most congested node in each of at least the first path and the second path.

13. A method for wireless communication, comprising:
establishing, at a network node that serves two or more child nodes through two or more different paths in a wireless communications network, a connection with a mobile termination (MT) function via a first child node and a first path;
configuring the MT function with a network configuration, wherein the network configuration includes network load information associated with the first path and at least a second path of the two or more different paths; and
receiving, at the network node, a report from the MT function that indicates a change in a network load of one or more of the first path or the second path, or a difference in network loads between the first path and the second path, the network loads of the first path and the second path including one or more units of data traffic to be transmitted from the MT function to the network.

14. The method of claim 13, wherein the first child node connects with the network node via an anchor node in the wireless communications network.

15. The method of claim 13, further comprising:
transmitting, responsive to the report from the MT function, an indication to the MT function to switch the connection with the network node from the first path to the second path.

16. The method of claim 13, wherein one or more of the child nodes are integrated access and backhaul (IAB) nodes, and wherein one or more IAB nodes may be incorporated in one or more base stations in the wireless communications network.

17. The method of claim 13, wherein the network configuration indicates that the report from the MT function is to be triggered based at least in part on one or more of:
a congestion of one or more nodes within the first path or the second path,
a congestion of one or more links within the first path or the second path,
a resource utilization of one or more nodes within the first path or the second path,
a resource utilization of one or more links within the first path or the second path,
a number of other nodes connected with the network node via one or more nodes within the first path or the second path,
or any combinations thereof.

18. The method of claim 13, further comprising:
receiving, from the MT function, a measurement report including one or more channel conditions measured at the MT function, the measurement report transmitted responsive to switching of the connection from the first path to the second path.

19. The method of claim 18, wherein the one or more channel conditions comprise a reference signal received power (RSRP), a reference signal received quality (RSRQ), a signal to interference and noise ratio (SINR), or any combinations thereof.

20. The method of claim 13, further comprising:
receiving, from the MT function, an adjusted network load report that indicates the change in network load of one or more of the child nodes, or a difference between two or more network loads.

21. The method of claim 13, wherein the network configuration further includes network load information of a most congested node in each of at least the first path and the second path.

* * * * *